(12) United States Patent
Kubo

(10) Patent No.: US 8,191,156 B2
(45) Date of Patent: May 29, 2012

(54) DOCUMENTS MANIPULATION AUTHENTICATION APPARATUS, DOCUMENT MANIPULATION APPARATUS, IMAGE FORMATION APPARATUS, DOCUMENT MANIPULATION AUTHENTICATION SYSTEM, COMPUTER READABLE MEDIUM AND COMPUTER DATA SIGNAL

(75) Inventor: Shusaku Kubo, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1419 days.

(21) Appl. No.: 11/785,331

(22) Filed: Apr. 17, 2007

(65) Prior Publication Data

US 2008/0077996 A1 Mar. 27, 2008

(30) Foreign Application Priority Data

Sep. 25, 2006 (JP) ................................ P2006-258270

(51) Int. Cl.
*H04L 29/06* (2006.01)
(52) U.S. Cl. .......... 726/27; 358/3.28; 709/225; 709/229
(58) Field of Classification Search .................. 713/193; 726/2, 27; 358/3.28; 241/101.2, 236; 709/225, 709/229; 707/200
See application file for complete search history.

(56) References Cited

U.S. PATENT DOCUMENTS

| | | | | |
|---|---|---|---|---|
| 5,897,643 A * | 4/1999 | Matsumoto | ............... | 715/234 |
| 6,378,070 B1 * | 4/2002 | Chan et al. | ............... | 713/155 |
| 6,567,916 B1 * | 5/2003 | Terao et al. | ............... | 713/176 |
| 6,609,200 B2 * | 8/2003 | Anderson et al. | ............... | 713/176 |
| 7,032,813 B2 | 4/2006 | Mizuguchi | ............... | 235/375 |
| 7,085,932 B1 * | 8/2006 | Morgan, III | ............... | 713/182 |
| 7,086,085 B1 * | 8/2006 | Brown et al. | ............... | 726/7 |
| 2001/0036297 A1 * | 11/2001 | Ikegami et al. | ............... | 382/115 |
| 2002/0042884 A1 * | 4/2002 | Wu et al. | ............... | 713/201 |
| 2002/0082997 A1 * | 6/2002 | Kobata et al. | ............... | 705/51 |
| 2005/0021980 A1 * | 1/2005 | Kanai | ............... | 713/182 |
| 2005/0108549 A1 * | 5/2005 | Kanai | ............... | 713/182 |
| 2006/0095389 A1 | 5/2006 | Hirota et al. | ............... | 705/67 |
| 2006/0161635 A1 * | 7/2006 | Lamkin et al. | ............... | 709/217 |
| 2006/0257186 A1 * | 11/2006 | Beppu | ............... | 400/62 |
| 2006/0262665 A1 * | 11/2006 | Cho | ............... | 369/1 |
| 2007/0035774 A1 * | 2/2007 | Kubo | ............... | 358/3.28 |
| 2007/0080249 A1 * | 4/2007 | Hamasuna et al. | ............... | 241/36 |
| 2007/0156897 A1 * | 7/2007 | Lim | ............... | 709/225 |
| 2007/0208785 A1 * | 9/2007 | Hayashi et al. | ............... | 707/203 |
| 2010/0149570 A1 * | 6/2010 | Kamiya et al. | ............... | 358/1.13 |

FOREIGN PATENT DOCUMENTS

| | | |
|---|---|---|
| JP | 2003-122616 | 4/2003 |
| JP | 2004-252679 | 9/2004 |
| JP | 2005-055999 | 3/2005 |
| JP | 2005-144900 | 6/2005 |
| JP | 2005-300605 | 10/2005 |
| JP | 2006-079017 | 3/2006 |
| JP | 2006-127293 | 5/2006 |
| JP | 2006-236295 | 9/2006 |

* cited by examiner

*Primary Examiner* — Hadi Armouche
(74) *Attorney, Agent, or Firm* — Morgan, Lewis & Bockius LLP

(57) ABSTRACT

A document manipulation authentication apparatus includes a storage section and a determination section. The storage section stores management information associating each document with at least one of devices. When a request for manipulating a specific document using a specific device is made, the determination section determines as to whether or not the requested specific manipulation is permitted, based on whether or not the specific document and the specific device are associated with each other in the management information stored in the storage section.

7 Claims, 15 Drawing Sheets

FIG. 4

| DOCUMENT ID | OPERATOR ID | DEVICE ID | MANIPULATION INFORMATION | DOCUMENT NAME | STORAGE LOCATION |
|---|---|---|---|---|---|
| 060508123456 | 18600 | 12:34:56:78:9A:BC | B, DL, C, P, F | NEW FUNCTION SPECIFICATION | https://arc.abc.co.jp/129 |
| | 24566 | 12:34:56:78:9A:BD | B, P | | |
| 060508123457 | 18600 | 12:34:56:78:9A:BC | B, DL, C, P, F | BUDGET MANAGEMENT TABLE | https://arc.abc.co.jp/127 |
| | 26452 | 12:34:56:78:9A:BE | B, P | | |
| 060509111111 | 24566 | 12:34:56:78:9A:BD | B, DL, C, P, F | NEW FUNCTION DRAWING | https://arc.abc.co.jp/112 |
| ⋮ | ⋮ | ⋮ | ⋮ | ⋮ | ⋮ |

FIG. 8

| DOCUMENT ID | OPERATOR ID | DEVICE ID | MANIPULATION INFORMATION | AREA INFORMATION | DOCUMENT NAME | STORAGE LOCATION |
|---|---|---|---|---|---|---|
| 060508123456 | 18600 | 12:34:56:78:9A:BC | B, DL, C, P, F | 123.234.-.- | NEW FUNCTION SPECIFICATION | https://arc.abc.co.jp/129 |
|  | 24566 | 12:34:56:78:9A:BD | B, P | 123.345.-.- |  |  |
| 060508123457 | 18600 | 12:34:56:78:9A:BC | B, DL, C, P, F | 123.234.56.- | BUDGET MANAGEMENT TABLE | https://arc.abc.co.jp/127 |
|  | 26452 | 12:34:56:78:9A:BE | B, P |  |  |  |
| 060509111111 | 24566 | 12:34:56:78:9A:BD | B, DL, C, P, F | 123.234.56.- | NEW FUNCTION DRAWING | https://arc.abc.co.jp/112 |
| ... | ... | ... | ... | ... | ... | ... |

FIG. 12A

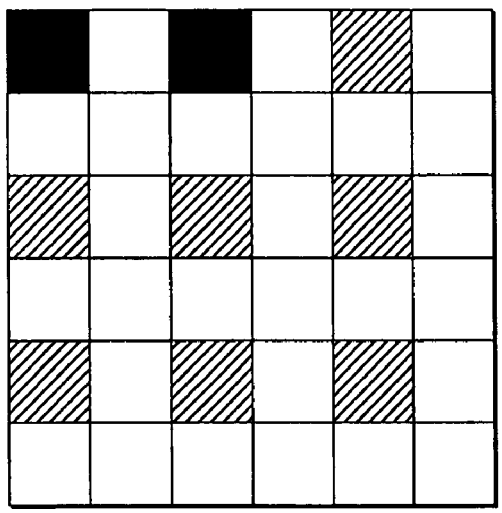

FIG. 12B

| SYNCHRO-NOUS CODE 2BIT | X POSITION CODE 5BIT | X POSITION CODE 5BIT | X POSITION CODE 5BIT | X POSITION CODE 5BIT |
|---|---|---|---|---|
| Y POSITION CODE 5BIT | IDENTIFI-CATION CODE 5BIT | IDENTIFI-CATION CODE 5BIT | IDENTIFI-CATION CODE 5BIT | IDENTIFI-CATION CODE 5BIT |
| Y POSITION CODE 5BIT | IDENTIFI-CATION CODE 5BIT | IDENTIFI-CATION CODE 5BIT | IDENTIFI-CATION CODE 5BIT | IDENTIFI-CATION CODE 5BIT |
| Y POSITION CODE 5BIT | IDENTIFI-CATION CODE 5BIT | IDENTIFI-CATION CODE 5BIT | IDENTIFI-CATION CODE 5BIT | IDENTIFI-CATION CODE 5BIT |
| Y POSITION CODE 5BIT | IDENTIFI-CATION CODE 5BIT | IDENTIFI-CATION CODE 5BIT | IDENTIFI-CATION CODE 5BIT | IDENTIFI-CATION CODE 5BIT |

DOCUMENTS MANIPULATION AUTHENTICATION APPARATUS, DOCUMENT MANIPULATION APPARATUS, IMAGE FORMATION APPARATUS, DOCUMENT MANIPULATION AUTHENTICATION SYSTEM, COMPUTER READABLE MEDIUM AND COMPUTER DATA SIGNAL

CROSS-REFERENCE TO RELATED APPLICATIONS

This application is based on and claims priority under 35 U.S.C. §119 from Japanese Patent Application No. 2006-258270 filed Sep. 25, 2006.

BACKGROUND

Technical Field

The invention relates to a document manipulation authentication apparatus, a document manipulation apparatus, an image formation apparatus, a document manipulation authentication system, a computer readable medium and a computer data signal.

SUMMARY

According to an aspect of the invention, a document manipulation authentication apparatus includes a storage section and a determination section. The storage section stores management information associating each document with at least one of devices. When a request for manipulating a specific document using a specific device is made, the determination section determines as to whether or not the requested specific manipulation is permitted, based on whether or not the specific document and the specific device are associated with each other in the management information stored in the storage section.

BRIEF DESCRIPTION OF THE DRAWINGS

Exemplary embodiments of the invention will be described below in detail with reference to the accompanying drawings, wherein:

FIG. 4 is a drawing to show an example of management information used in the first exemplary embodiment of the invention;

FIG. 8 is a drawing to show an example of management information used in the second exemplary embodiment of the invention;

FIG. 12 is a drawing to describe a code pattern generated in the second exemplary embodiment of the invention;

DETAILED DESCRIPTION

Exemplary embodiments of the invention will be described in detail with reference to the accompanying drawings.

[First Exemplary Embodiment]

First, the system configuration according to exemplary embodiments will be described.

Figure 1:
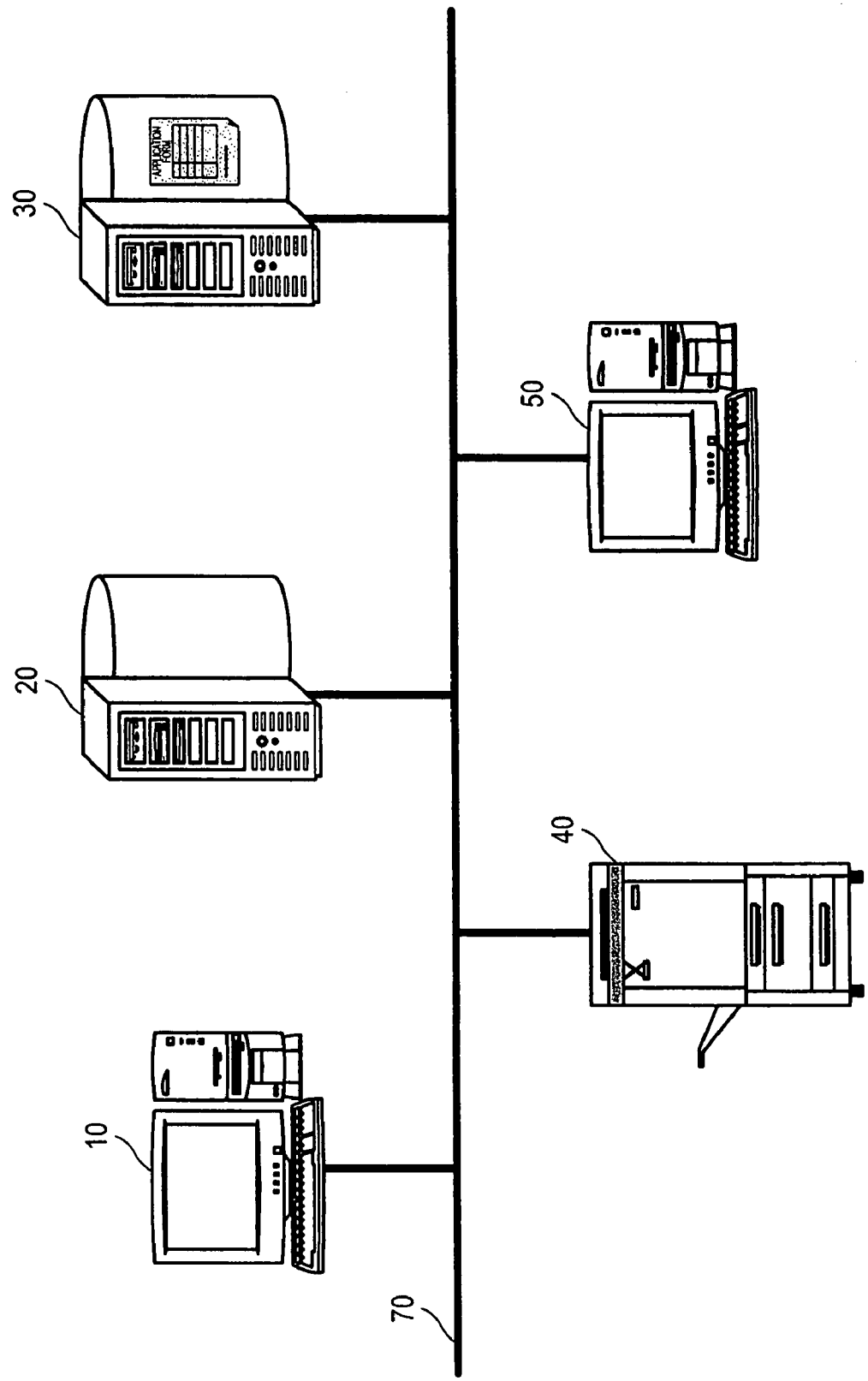
FIG. 1 is a drawing to show the configuration of a system according to a first exemplary embodiment of the invention.

FIG. 1 shows the configuration of a system according to the exemplary embodiments of the invention.

As shown in FIG. 1, the system according to the exemplary embodiments includes a client 10, a document management server 20, a document storage server 30, an image formation apparatus 40, and a client 50, which are connected to a network 70.

The client 10 is a client computer used to register an electronic document in a document management system including the document management server 20 and the document storage server 30. For example, the client 10 is a PC (Personal Computer).

The document management server 20 is a server computer for storing management information of electronic documents and for examining access right to each electronic document based on the management information. In the exemplary embodiment, the document management server 20 is adopted as an example of a document manipulation authentication apparatus. In the exemplary embodiment, the document management server 20 is also an example of a control apparatus that controls so that the same user is permitted to manipulate the same document if the user uses one apparatus and that the same user is not permitted to manipulate the same document if the user uses another apparatus.

The document storage server 30 is a server computer for storing electronic documents.

The image formation apparatus 40 forms an image of an electronic document on a medium. As a method for forming an image on a medium, for example, electrophotography may be used. Alternatively any other method may be used. The image formation apparatus 40 includes a facsimile function of transmitting the image of an electronic document to another image formation apparatus (not shown) via a telephone line, for example. In the exemplary embodiment, the image formation apparatus 40 is an example of a control section that controls manipulation of a document.

The client 50 is a client computer used for the user to make a request for manipulation of an electronic document. For example, the client 50 is a PC. In the exemplary embodiment, the client 50 is adopted as an example of a document manipulation apparatus. Also, the client 50 is adopted as an example of an instruction section that instructs to manipulate a document. Further, the client 50 is also an example of a control section that controls manipulation of a document.

The network 70 is the Internet, a LAN (Local Area Network), etc. The client 10, the document management server 20, the document storage server 30, the image formation apparatus 40, and the client 50 connected to the network 70 can communicate with each other.

By the way, in the system, the client 10 for making the request for registration of an electronic document and the client 50 for making the request for manipulation of an electronic document are provided separately. However, one client may be used to make both the request for registration of an electronic document and the request for manipulation of an electronic document.

The term "electronic document" in the Specification is used not only to mean data provided by computerizing a "document" containing text, but also to mean printable electronic data including image data such as a picture, a photo, a pattern, etc., (regardless of raster data or vector data), numeric data recorded in a database or a spreadsheet program, etc.

In the exemplary embodiment, in the system having the above configuration, at first the document management server 20 registers an electronic document in response to a request for registration of an electronic document from the client 10. Next, the document management server 20 determines as to whether or not the requested manipulation of the electronic document is permitted in response to a request for registration of an electronic document from the client 50. That is, the document management server 20 plays a central role in performing the process in both cases.

Then, to begin with, the functional configuration of the document management server 20 according to the first exemplary embodiment will be described.

Figure 2:
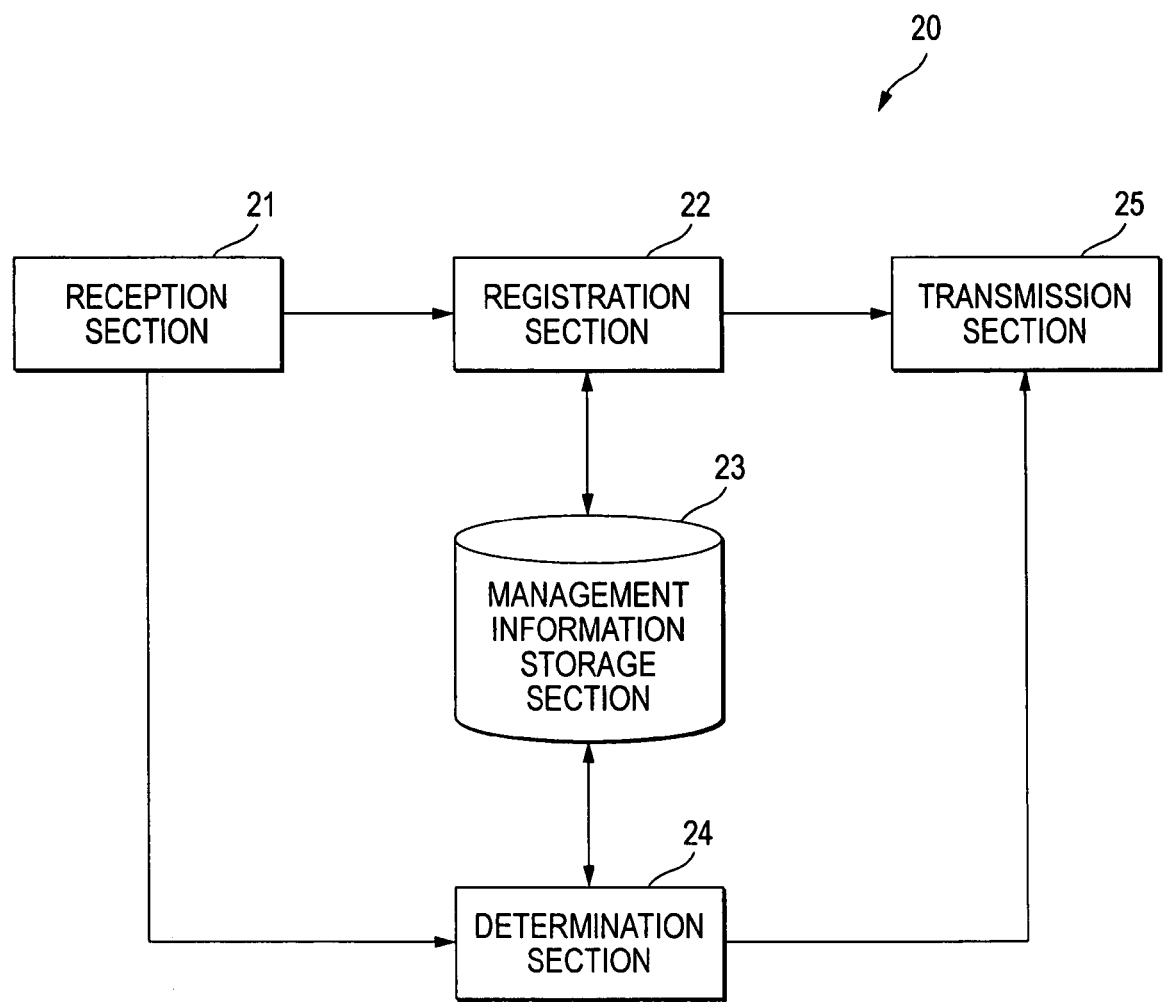
FIG. 2 is a block diagram to show the functional configuration of a document management server according to the first exemplary embodiment of the invention.

FIG. 2 is a block diagram to show the functional configuration of the document management server 20.

As shown in FIG. 2, the document management server 20 includes a reception section 21, a registration section 22, a management information storage section 23, a determination section 24, and a transmission section 25.

The reception section 21 receives a request for registration of an electronic document from the client 10 and receives a request for manipulation of an electronic document from the client 50.

When the reception section 21 receives the request for registration of an electronic document from the client 10, the registration section 22 registers management information of the electronic document.

The management information storage section 23 stores the management information of the electronic document.

When the reception section 21 receives the request for manipulation of an electronic document from the client 50, the determination section 24 determines as to whether or not manipulation of the electronic document is permitted based on the management information stored in the management information storage section 23.

The transmission section 25 transmits the document ID of the electronic document to the client 10, transmits the electronic document to the client 50, and transmits an instruction for printing the electronic document or transmitting the electronic document by fax to the image formation apparatus 40.

The functions are implemented as the software and hardware resources cooperate. Specifically, a CPU of the document management server 20 reads and executes a program for implementing the reception section 21, the registration section 22, the determination section 24, and the transmission section 25, for example, into main memory from a magnetic disk unit, whereby the functions are implemented. The management information storage section 23 can be implemented using a magnetic disk unit, for example. Further, the program and data stored in the magnetic disk unit may be loaded from a record medium such as a CD or may be downloaded through a network of the Internet, etc.

Next, the operation of the system according to the first exemplary embodiment will be described below.

The operation of the first exemplary embodiment is classified into the operation in registering an electronic document and the operation in manipulating an electronic document as described above.

Then, at first the operation in registering an electronic document will be described.

An operator creates an electronic document using the client 10 and instructs the client 10 to register the created electronic document in the document management system including the document management server 20 and the document storage server 30. Then, the client 10 transmits the electronic document to the document management server 20 together with various pieces of information used to determine as to whether or not manipulation of the electronic document is permitted. The various pieces of information transmitted together with the electronic document may contain identification information of the operator who is permitted to manipulate the electronic document (which will be hereinafter referred to as an "operator ID"), identification information of devices (clients) that are permitted to instruct to manipulate the electronic document (which will be hereinafter referred to as a "device ID"), and information of manipulation that is permitted to be performed for the electronic document (which will be hereinafter referred to as "manipulation information").

The operator ID may be any so long it can identify each operator. If the system is used in a company, the employee number may be used, for example.

The device ID may be any so long as it can identify each device (client). MAC address is available by way of example. Alternatively, IP address may be used.

Further, the manipulation information is definition of manipulation(s) that is (are) permitted to be performed for an electronic document. Such manipulation may include browsing (the electronic document itself is not sent to the client), download (the electronic document itself is sent to the client), copy, print, and/or facsimile transmission, for example. In the exemplary embodiment, however, it is assumed that "manipulation" is manipulation for an electronic document. Therefore, the term "copy" mentioned here is used to mean printing of an electronic document on another medium rather than usual copy of reading an image printed on a medium and printing the image on another medium. The term "facsimile transmission" is used to mean transmission of an electronic document as image data rather than transmission of reading and transmitting an image printed on a medium.

At this time, the operator may transmit management information that is referred to when the operator accesses the registered electronic document and management information that is referred to when another person accesses the registered electronic document.

In the latter case, the system automatically acquires the operator ID, the device ID, and the manipulation information. For example, it is assumed that the operator starts to use the client 50 using an IC card in which the operator ID of the operator is recorded. In this case, while the operator logs in to the system, the operator ID of the operator is stored in a memory and thus may be read. The device ID is also stored in a predetermined area of a memory of the client 50 and thus may be read. Further, all manipulations may be automatically registered as the manipulation information. A person who registers an electronic document is often the creator of the electronic document. Thus, it is considered that no problem is involved if he/she is granted all authority over manipulations of the electronic document.

On the other hand, in the latter case, the operator who makes a request for registration of an electronic document inputs an operator ID of the other operation, a device ID of the other operation and manipulation information of the other operation through a screen (not shown) and transmits them. The operator ID is the employee number, for example, identifying the other operator. The device ID is a device ID of a client used by the other operator. As the manipulation information, the operator may specify what manipulation for the electronic document registered by the operator the other operator is permitted to perform.

In the above description, the system automatically acquires the operator ID, the device ID, and the manipulation information about the operator who makes the request for registration of an electronic document. However, the operator who makes the request for registration of an electronic document may also input and transmit such information. Particularly, in the case of registering an electronic document not created by the operator, only the operation is permitted to register only some manipulations as manipulation information. In this case, operator's it would be more convenience that the operation specifies each information and registers, rather than that the system automatically registers.

When the electronic document and various pieces of information are thus transmitted, the operation of the document management server 20 is started.

Figure 3:
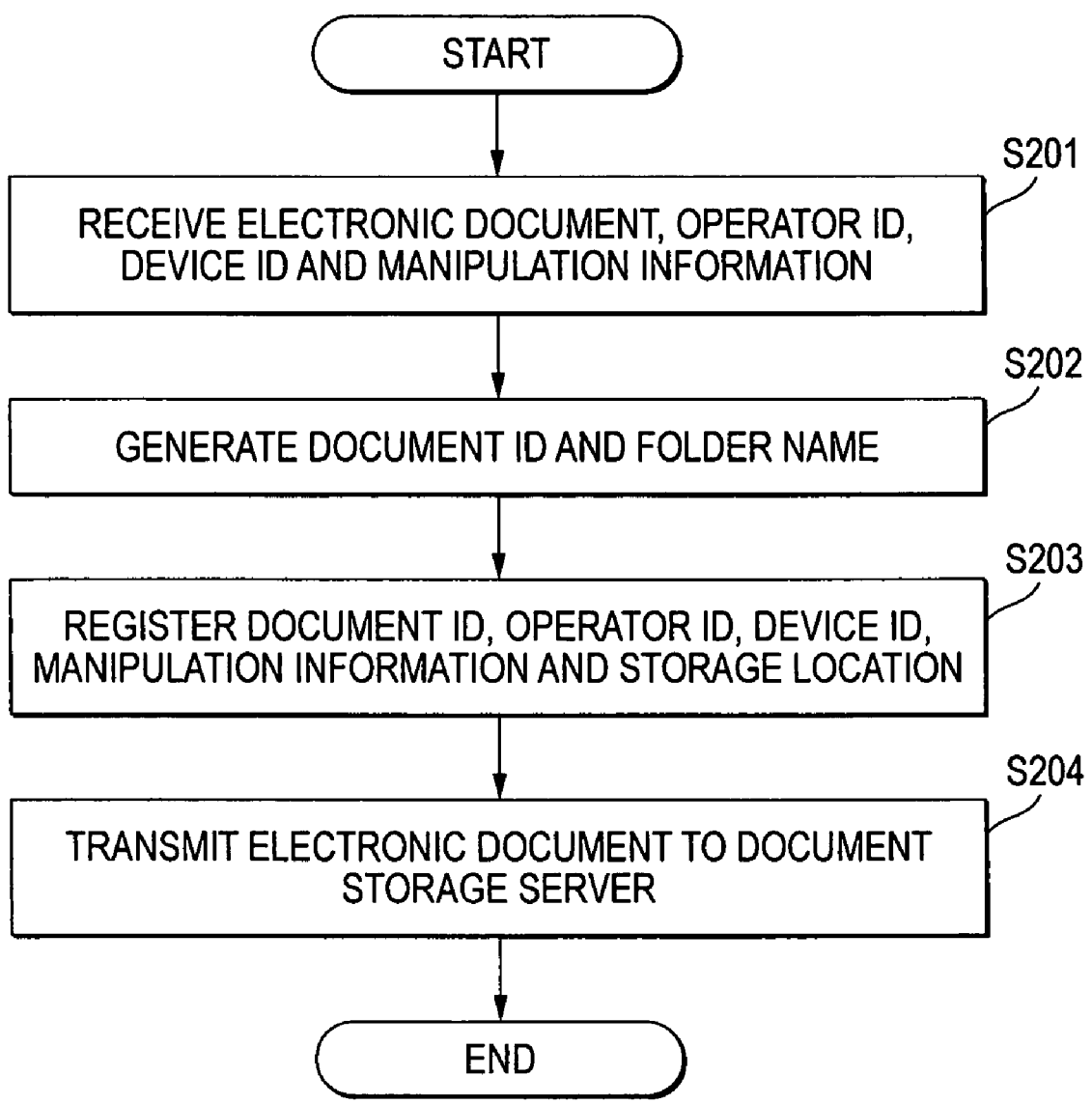
FIG. 3 is a flowchart to show the operation of the document management server according to the first exemplary embodiment of the invention when an electronic document is registered.

FIG. 3 is a flowchart to show the operation of the document management server 20 at this time.

In the document management server 20, first the reception section 21 receives the electronic document, the operator ID, the device ID, the manipulation information, etc., and sends them to the registration section 22 (step 201).

Then, the registration section 22 generates identification information that uniquely identifies the received electronic document (which will be hereinafter referred to as "document ID") and also generates a folder name that is a storage location of the electronic document (step 202). The document ID may be UUID (Universally Unique Identifier) generated by the document management server, for example. The UUID is an ID provided by combining the MAC address of each device and creation time of the electronic document.

Next, the registration section 22 stores management information that associates the document ID generated at step 202, the operator ID, the device ID and the manipulation information, which are received at step 201, and the storage location generated at step 202 with each other in the management information storage section 23 (step 203).

The registration section 22 sends the electronic document to the transmission section 25, which then transmits the electronic document to the document storage server 30 (step 204). It is assumed that the document management server 20 functions like a so called reverse proxy, and that the document storage server 30 can be accessed only via the document management server 20.

Accordingly, the electronic document transmitted by the client 10 is stored in the document storage server 30, and the management information of the electronic document is stored in the document management server 20. The document ID assigned to the electronic document may be returned to the client 10 after the electronic document is stored in the document storage server 30.

An example of the management information stored in the management information storage section 23 when the document management server 20 operates as shown in FIG. 3 will be described.

FIG. 4 is a drawing to show an example of the management information.

As shown in FIG. 4, the management information associates the document IDs, the operator IDs, the device IDs, the manipulation information, the document names, and the storage locations with each other. Each device ID indicates the MAC address of a client assigned to each operator. The symbols in the manipulation information are as follows: "B" denotes browsing, "DL" denotes download, "C" denotes copy, "P" denotes print, and "F" denotes facsimile transmission.

FIG. 4 shows "new function specification" having a document ID "060508123456," "budget management table" having a document ID "060508123457," and "new function drawing" having a document ID "060509111111." For each electronic document, it is assumed that the operator ID, the device ID, and the manipulation information in the first row relates to an operator who registers the corresponding electronic document and that the operator ID, the device ID, and the manipulation information in the second row relates to operator(s) other than the operator who registers the corresponding electronic document. That is, for example, when an operator having an operator ID "18600" registers the "new function specification," the operator also registers the access authority of an operator ID "24566." In FIG. 4, the number of operators other than the operator who registers the electronic document is one at the maximum. However, the number is not limited thereto and any number of operators may be registered.

Although not shown in FIG. 4, information regarding a time period in which an electronic document is permitted to be manipulated may be associated with the electronic document. In this case, a request for manipulation of the electronic document is only permitted in the associated time period. The time period in which an electronic document is permitted to be manipulated may be a start timing indicating that the electronic document is permitted to be manipulated on and after certain day (e.g., on and after Jan. 1, 2007) or an end timing indicating that the electronic document is permitted to be manipulated until a certain day (e.g., until Jan. 1, 2008).

Next, the operation in manipulating an electronic document will be described.

The operator informs the client 50 of manipulation start of an electronic document. Then, the client 50 transmits an operator ID of the operator and a device ID of the client 50 to the document management server 20.

Then, the operation of the document management server 20 starts.

Figure 5:
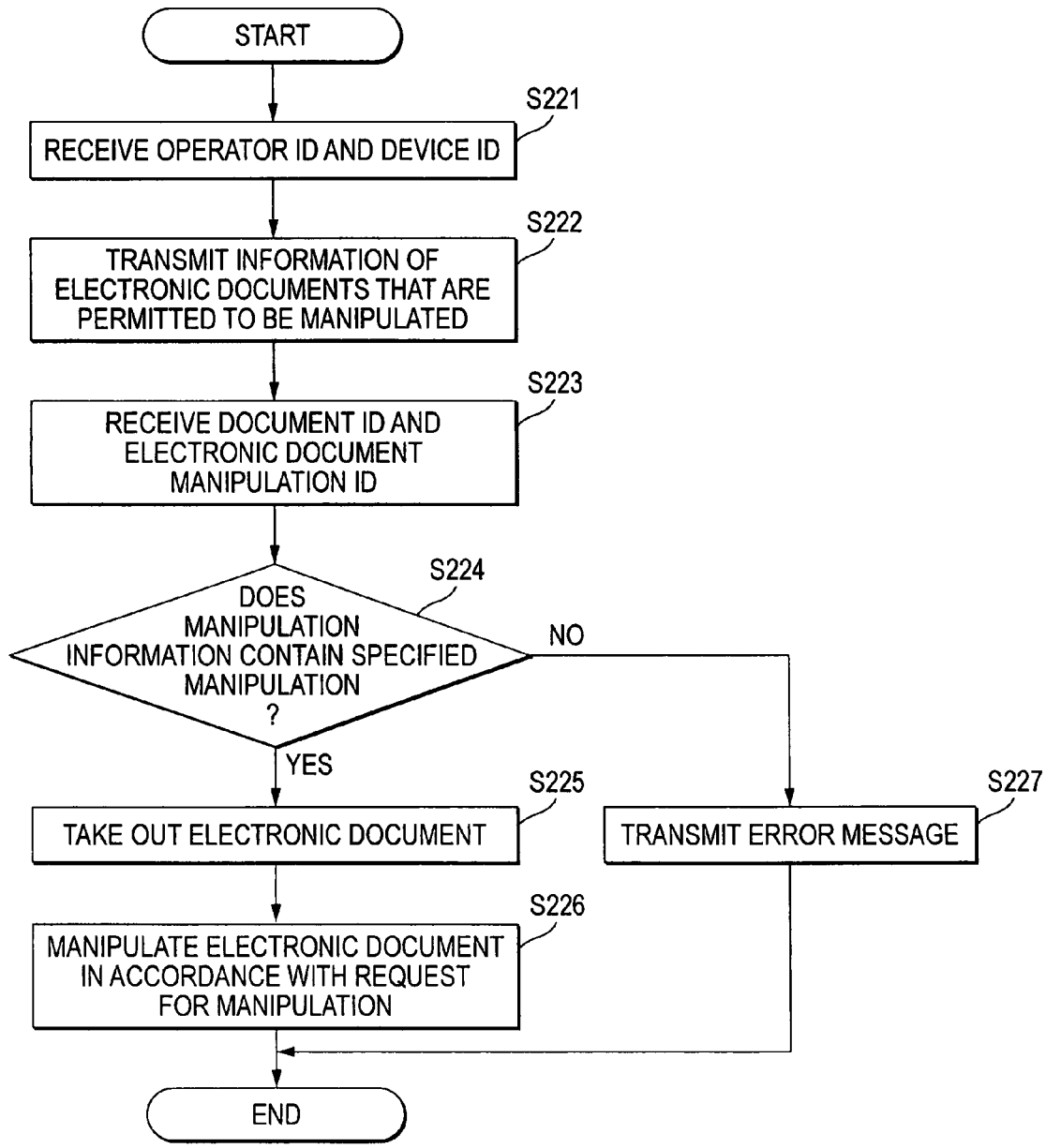
FIG. 5 is a flowchart to show the operation the document management server according to the first exemplary embodiment of the invention when a request for manipulation of an electronic document is received.

FIG. 5 is a flowchart to show the operation of the system at this time.

In the document management server 20, at first the reception section 21 receives the operator ID and the device ID from the client 50 and Sends them to the determination section 24 (step 221).

Then, the determination section 24 refers to the management information stored in the management information storage section 23 and acquires information of an electronic documents associated with the received operator ID and the received device ID. That is, the determination section 24 acquires the information of the electronic documents that the operator of the client 50 is permitted to manipulate, and sends the acquired information to the transmission section 25. The transmission section 25 transmits the acquired information of the electronic documents to the client 50 (step 222).

Consequently, the client 50 allows the operator to see electronic document names of the electronic documents that the operator is permitted to access. Then, the operator selects any desired electronic document from among the electronic document names and instructs the client 50 to manipulate the electronic document. The manipulation of the electronic document includes browsing, download, copy, print and facsimile transmission, as described above. The client 50 transmits a document ID of the selected electronic document and a request for manipulation of the selected electronic document to the document management server 20.

Then, in the document management server 20, the reception section 21 receives the document ID and the request for manipulation and sends them to the determination section 24 (step 223).

The determination section 24 acquires manipulation information associated with the combination of the operator ID and the device ID received at step 221 and the document ID received at step 223. The determination section 24 determines as to whether or not the acquired manipulation information contains manipulation specified in the request for manipulation received at step 223 (step 224).

If the determination section 24 determines that the acquired manipulation information contains the specified manipulation, the electronic document is taken out from the document storage server 30 (step 225). Specifically, the management information is searched for the storage location of the electronic document based on the document ID. The electronic document is taken out from the storage location.

Then, the electronic document is manipulated in accordance with the manipulation request (step 226). For example, if the request for manipulation is a request for browsing the electronic document, the client 50 is permitted to access the document storage server 30 and the operator is permitted to browse the electronic document. If the request for manipulation is a request for downloading the electronic document, the electronic document is transmitted to the client 50. If the request for manipulation is a request for copying or printing the electronic document, a command for printing the electronic document is transmitted to the image formation apparatus 40. Further, if the request for manipulation is a request for transmitting the electronic document by facsimile, a command for transmitting the electronic document by facsimile is transmitted to the image formation apparatus 40.

On the other hand, if the determination section 24 does not determine that the manipulation information contains the specified manipulation, an error message indicating that the specified manipulation for the specified electronic document cannot be executed is transmitted to the client 50 (step 227).

In the exemplary embodiment, the device ID is described as the identification information of the client 50, but may be adopted as the identification information of the image formation apparatus 40. In so doing, if the image formation apparatus 40 scans a print document on which an image of an electronic document is printed, it may be determined as to whether or not a copy process of printing an original electronic document of the image on another medium or a facsimile transmission process of transmitting the original electronic document over a telephone line is permitted.

[Second Exemplary Embodiment]

The resources in the same LAN or the Intranet have been often used from a remote location (the outside of the same LAN or the Intranet) with the development of a Web system. In this case, there is a demand for restricting a handling range of a secret document in order to prevent information leakage. Then, in the second exemplary embodiment, document manipulation is restricted in accordance with a location of a device that accesses the resources.

To begin with, the system configuration according to a second exemplary embodiment will be described.

Figure 6:
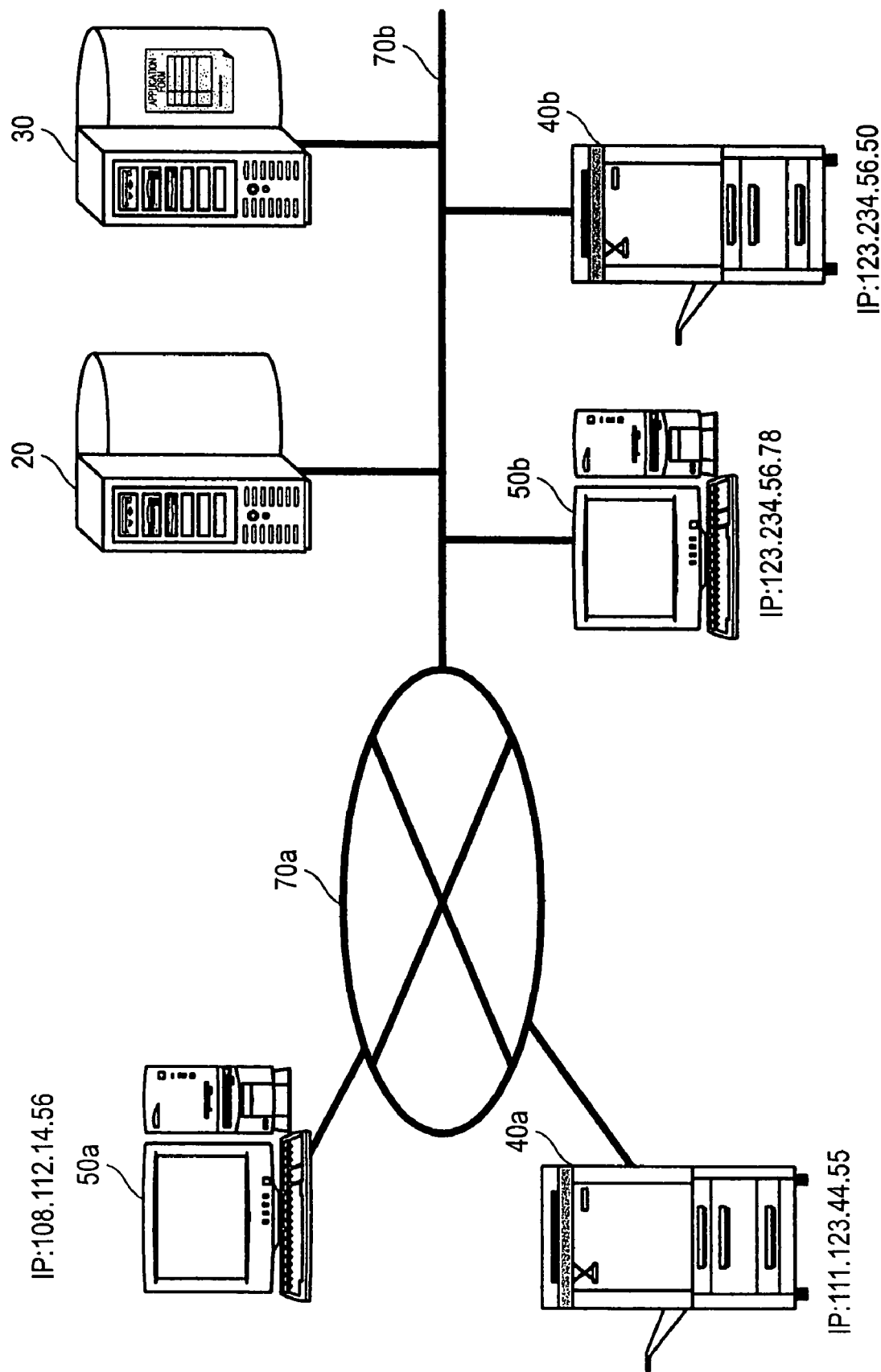
FIG. 6 is a drawing to show the configuration of a system according to a second exemplary embodiment of the invention.

FIG. 6 shows the configuration of a system according to the second exemplary embodiment of the invention.

As shown in FIG. 6, the system according to the second exemplary embodiment includes devices connected to networks 70a and 70b. Specifically, an image formation apparatus 40a and a client 50a are connected to the network 70a. A document management server 20, a document storage server 30, an image formation apparatus 40b and a client 50b are connected to the network 70b.

The document management server 20 is a server computer for storing management information of electronic documents and examining access right to each electronic document based on the management information. In the exemplary embodiment, the document management server 20 is adopted as an example of a document manipulation authentication apparatus. In the exemplary embodiment, the document management server 20 is also an example of a control apparatus that controls so that the same user is permitted to manipulate the same document if the user uses one apparatus and that the same user is not permitted to manipulate the same document if the user uses another apparatus.

The document storage server 30 is a server computer for storing the electronic documents.

Each of the image formation apparatus 40a and 40b forms an image of an electronic document on a medium. As a method of forming an image on a medium, for example, electrophotography may be used. Alternatively, any other method may be used. Each of the image formation apparatus 40a and 40b includes a facsimile function of transmitting the image of an electronic document to another image formation apparatus (not shown) via a telephone line, for example. Further, in the exemplary embodiment, each of the image formation apparatus 40a and 40b also has a function of scanning a print document provided by printing the image of an electronic document on a medium. Thus, each of the image formation apparatus 40a and 40b may also be understood as a copier because it has the scanning function and the image formation function. Although the image formation apparatus 40a and 40b are distinguished in FIG. 6, when they are not distinguished, they are described as the "image formation apparatus 40" as a representative. In the exemplary embodiment, the image formation apparatus 40 is adopted as an example of a document manipulation apparatus. The image formation apparatus 40 is also an example of an instruction section that instructs to manipulate a document. Further, the image formation apparatus 40 is also an example of a control section that controls manipulation of a document.

The clients 50a and 50b are client computers used for users to make a request for manipulation of an electronic document. For example, they are PCs. Although the clients 50a and 50b are distinguished in FIG. 6, when they are not distinguished, they are described as the "client 50" as a representative. In the exemplary embodiment, the client 50 is adopted as an example of a document manipulation apparatus. Also, the client 50 is an example of an instruction section that instructs to manipulate a document. Further, the client 50 is also an example of a control section that controls manipulation of a document.

The network 70a is the Internet, for example. The network 70b is a LAN (Local Area Network), etc., for example, and forms an intranet. That is, the document management server 20, the document storage server 30, the image formation apparatus 40b, and the client 50b are placed in the intranet. The image formation apparatus 40a and the client 50a are placed outside the intranet. This configuration is illustrated in FIG. 6 by using "123.234.56.-" as the IP addresses of the image formation apparatus 40b and the client 50b by using addresses other than "123.234.56.-," as the IP addresses of the image formation apparatus 40a and the client 50a.

By the way, the system is not provided with a client for inputting a request for registration of an electronic document. However, the user may input a request for registration of an electronic document through a client for inputting a request for manipulation of an electronic document, for example, the client 50b.

Also in the exemplary embodiment, in the system having the above configuration, at first the document management server 20 registers an electronic document in response to a request for registration of an electronic document from the client 50. Next, the document management server 20 determines as to whether or not manipulation of the electronic document is permitted, in response to a request for manipulation of an electronic document from the client 50. In the first exemplary embodiment, whether or not manipulation of the specified electronic document is permitted is determined based on whether or not the association (combination) of the document ID, the operator ID, the device ID, and the manipulation information is registered as management information. In contrast, in the second exemplary embodiment, a location where the electronic document is handled is also considered in determining as to whether or not manipulation of the specified electronic document is permitted. Also, in this case, the document management server 20 plays a central role in performing the process. However, the functional configuration of the document management server 20 is similar to that shown in FIG. 2 and therefore will not be described again in detail.

Next, the operation of the system in the second exemplary embodiment will be described below.

The operation of the second exemplary embodiment is also classified into the operation in registering an electronic document and the operation in manipulating an electronic document as described above.

Then, at first, the operation in registering an electronic document will be described.

An operator creates an electronic document using the client 50 and instructs the client 50 to register the created electronic document in the document management system including the document management server 20 and the document storage server 30. Then, the client 50 transmits the created electronic document to the document management server 20 together with various pieces of information used to determine as to whether or not manipulation of the electronic document is permitted. The various pieces of information transmitted together with the electronic document contain an operator ID, a device ID, and manipulation information as in the first exemplary embodiment.

The operator ID may be any so long as it can identify each operator as described in the first exemplary embodiment.

The device ID may be any so long as it can identify each device (client) as described in the first exemplary embodiment. In the second exemplary embodiment, it is assumed that the device ID is MAC address.

Further, the manipulation information is definition of manipulation that is permitted to be performed for the electronic document. Such manipulation includes browsing (the electronic document itself is not sent to the client), download (the electronic document itself is sent to the client), copy, print, facsimile transmission, etc., for example. In the second exemplary embodiment, however, it is assumed that "manipulation" is manipulation for an electronic document. Therefore, the term "copy" mentioned here is used to mean printing of the original electronic document of an image printed on a medium on another medium rather than usual copy of reading an image printed on a medium and printing the image on another medium. The term "facsimile transmission" is used to mean transmission of the original electronic document of the image printed on a medium as image data rather than transmission of reading and transmitting an image printed on a medium.

In the second exemplary embodiment, the various pieces of information transmitted together with the electronic document also contain information about an area where the electronic document is permitted to be manipulated (which will be hereinafter referred to as "area information").

The area information may be any if it indicates a given area where the electronic document is permitted to be handled regardless of whether the area is wide or narrow. For example, an executive office or the like may be set or the lot of a factory may also be set as the area information. However, here a portion of the IP address that represents a range on the network rather than information indicating the physical location is transmitted.

At this time, the operator may transmit management information that is referred to when the operator accesses the registered electronic document and management information that is referred to when another person accesses the registered electronic document as in the first exemplary embodiment.

When the electronic document and the various pieces of information are thus transmitted, the operation of the document management server 20 is started.

Figure 7:
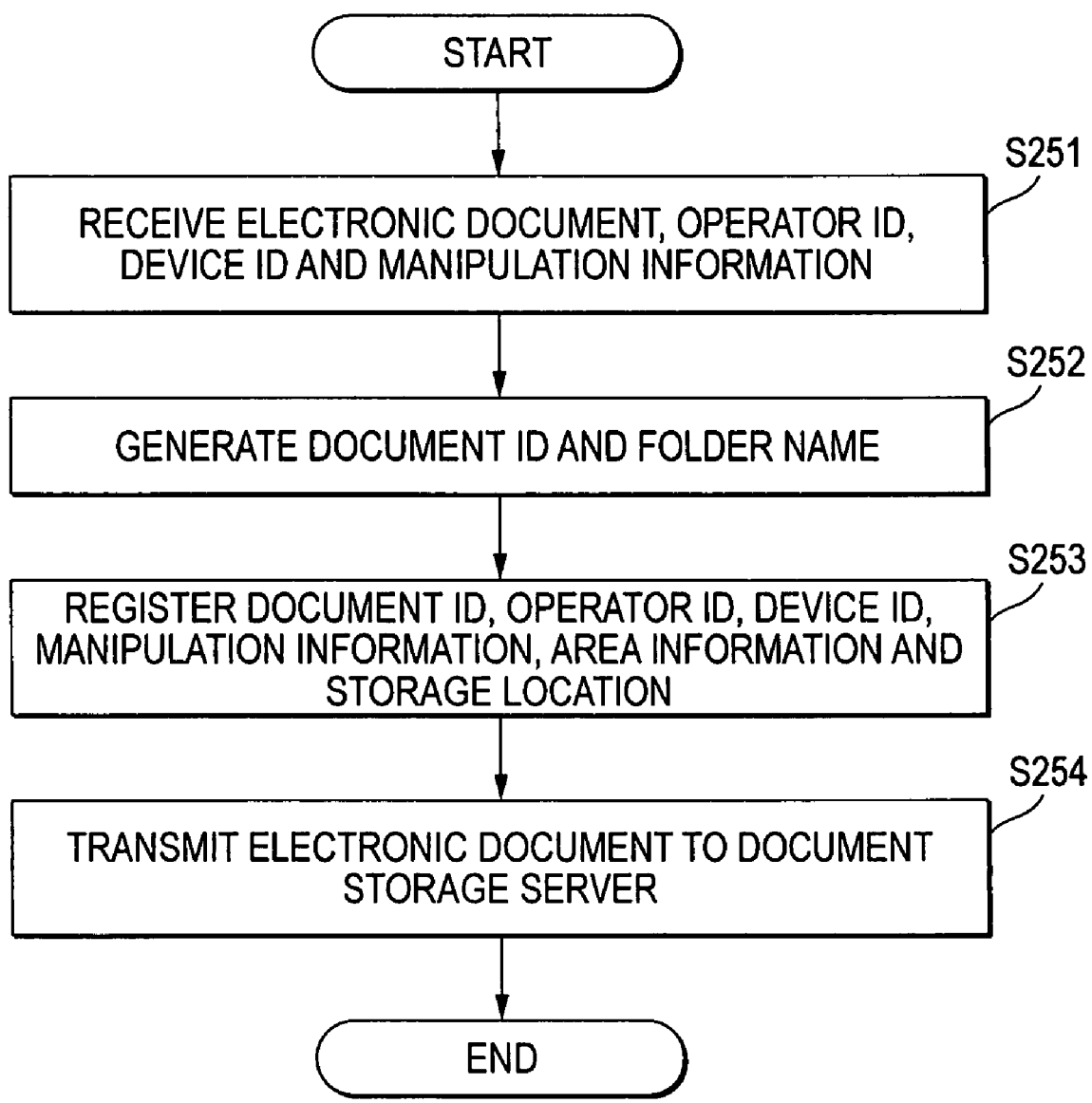
FIG. 7 is a flowchart to show the operation of a document management server according to the second exemplary embodiment when an electronic document is registered.

FIG. 7 is a flowchart to show the operation of the document management server 20 at this time.

In the document management server 20, at first a reception section 21 receives the electronic document, the operator ID, the device ID, the manipulation information, the area information, etc., and sends them to a registration section 22 (step 251).

Then, the registration section 22 generates a document ID that uniquely identifies the received electronic document and also generates a folder name indicating a storage location of the received electronic document (step 252).

Next, the registration section 22 stores management information that associates the document ID generated at step 252, the operator ID, the device ID, the manipulation information, the area information, etc., received at step 251, and the storage location generated at step 252 with each other in a management information storage section 23 (step 253).

The registration section 22 sends the electronic document to a transmission section 25, which then transmits the electronic document to the document storage server 30 (step 254). It is assumed that the document management server 20 functions like a reverse proxy and the document storage server 30 can be accessed only via the document management server 20.

Accordingly, the electronic document transmitted by the client 50 is stored in the document storage server 30 and the management information of the electronic document is stored in the document management server 20. The document ID assigned to the electronic document may be returned to the client 50 after the electronic document is stored in the document storage server 30.

An example of the management information stored in the management information storage section 23 when the document management server 20 operates as shown in FIG. 7 will be described.

FIG. 8 is a drawing to show an example of the management information.

As shown in FIG. 8, the management information is information associating the document ID, the operator ID, the device ID, the manipulation information, the area information, the document name, and the storage location with each other. That is, the area information is added to the management information of the first exemplary embodiment. The area information specifies a range on the network by a portion of the IP address.

For example, the first row of FIG. 8 indicates that the operator with an operator ID "18600" is permitted to manipulate "new function specification" having a document ID "060508123456" by a device having an IP address beginning with "123.234." That is, this operator is permitted to browse and download this electronic document by the client 50*b* and is permitted to copy, print, and transmit by facsimile this electronic document by the image formation apparatus 40*b*. However, the client 50*a* and the image formation apparatus 40*a* are outside the defined IP address range. Thus, the operator is not permitted to browse or download this electronic document by the client 50*a* and is not permitted to copy, print, or transmit by facsimile this electronic document by the image formation apparatus 40*a*.

Although not shown in FIG. 8, information regarding a time period in which an electronic document is permitted to be manipulated may be associated with the electronic document. In this case, a request for manipulation of the electronic document is only permitted in the associated time period. The time period in which an electronic document is permitted to be manipulated may be a start timing indicating that the electronic document is permitted to be manipulated on and after certain day (e.g., on and after Jan. 1, 2007) or an end timing indicating that the electronic document is permitted to be manipulated until a certain day (e.g., until Jan. 1, 2008).

Next, the operation in manipulating an electronic document will be described.

The operator informs the image formation apparatus 40 or the client 50 of manipulation start of an electronic document. Then, the image formation apparatus 40 or the client 50 transmits to the document management server 20: the document ID of the electronic document to be manipulated; the operator ID of the operator; the device ID of the image formation apparatus 40 or the client 50, for example, the MAC address; the identification information of the location where the image formation apparatus 40 or the client 50 is placed, for example, the IP address; and a request for manipulation. Information about an output destination apparatus of the electronic document is also transmitted depending on content of the request for manipulation. For example, when the request for manipulation is a request for print or a request for facsimile transmission, the output destination apparatus of the electronic document is transmitted. In this case, what instructs to manipulate the electronic document is the client 50, while the output destination apparatus of the electronic document is the image formation apparatus 40. Thus, the information about both the apparatus are sent to the document management server 20.

Then, the operation of the document management server 20 starts.

Figure 9:
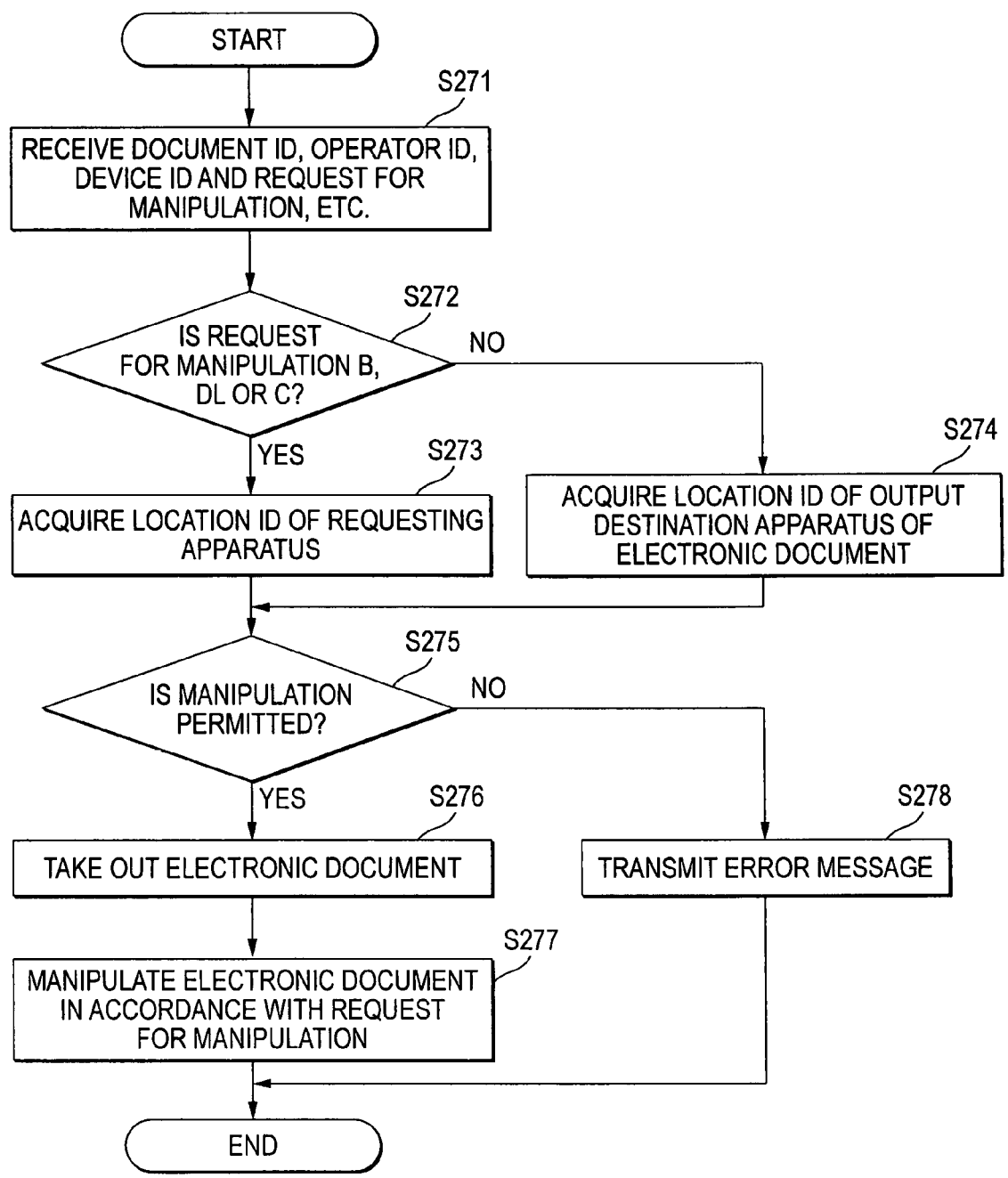
FIG. 9 is a flowchart to show the operation of the document management server according to the second exemplary embodiment of the invention when a request for manipulation of an electronic document is received.

FIG. 9 is a flowchart to show the operation of the system at this time.

In the document management server 20, at first the reception section 21 receives the document ID, the operator ID, the device ID, the manipulation request, etc., from the image formation apparatus 40 or the client 50 (step 271). It is determined as to whether or not the request for manipulation is any of a request for browsing, a request for download, and a request for copy (step 272).

If the request for manipulation is any of the request for browsing, the request for download, or a request for copy, the reception section 21 acquires information of the location where the apparatus, which makes the request for manipulation of the electronic document is placed, of the information received at step 271 as identification information of the location where the electronic document is to be handled (which will be hereinafter referred to as "location ID") (step 273). That is, if a request for browsing or a request for download is made, for example, the IP address of the client 50 is acquired as the location ID. If a request for copy is made, for example, the IP address of the image formation apparatus 40 is acquired as the location ID.

On the other hand, if the request for manipulation is not browsing, download, or copy, namely, is print or facsimile transmission, the reception section 21 acquires information of the location where the output destination apparatus of the electronic document, of the information received at step 271 as the location ID (step 274). That is, the IP address of the image formation apparatus 40 is acquired as the location ID, for example.

The reception section 21 sends the document ID, the operator ID, the device ID, and the request for manipulation received at step 271 and the location ID acquired at step 273 or 274 to a determination section 24.

Then, the determination section 24 refers to the management information stored in the management information storage section 23 and determines as to whether or not the requested manipulation is permitted (step 275). Specifically, the determination section 24 checks as to whether or not the management information associating the document ID, the operator ID, the device ID, the manipulation information, and the location ID with each other, which are sent from the reception section 21, is stored in the management information storage section 23.

If the determination section 24 determines that the management information is stored, the electronic document is taken out from the document storage server 30 (step 276). Specifically, the management information is searched for the storage location of the electronic document based on the document ID. The electronic document is taken out from the storage location.

Then, the electronic document is manipulated in accordance with the request for manipulation (step 277). For example, if the request for manipulation is a request for browsing the electronic document, the client 50 is permitted to access the document storage server 30 and the operator is permitted to browse the electronic document. If the request for manipulation is a request for downloading the electronic document, the electronic document is transmitted to the client 50. If the request for manipulation is a request for copying or printing the electronic document, a command for printing the electronic document is transmitted to the image formation apparatus 40. Further, if the request for manipulation is a request for transmitting the electronic document by facsimile, a command for transmitting the electronic document by facsimile is transmitted to the image formation apparatus 40.

On the other hand, if the determination section 24 does not determine that the management information is stored, an error message indicating the specified manipulation for the specified electronic document is not permitted to be executed is transmitted to the client 50 (step 278).

In this case, the error message may contain a message indicating which information of the document ID, the operator ID, the device ID, the manipulation information, and the location ID does not match the information stored in the management information storage section 23. For example, it is assumed that if the operator ID is excluded from the document ID, the operator ID, the device ID, the manipulation information, and the location ID, the management information associating the remainings is stored. In this case, a message indicating the electronic document is not permitted to be manipulated because only the operator ID is mismatched is sent to the client 50.

In such a case, the error message may contain a message indicating it will be permitted to manipulate the electronic document if a predetermined condition is satisfied. The possible predetermined condition is as follows. For example, if the operator ID is excluded from the document ID, the operator ID, the device ID, the manipulation information, and the location ID, the management information associating the remainings is stored. In this case, information that is substitution for the operator ID is input. The possible information that is substitution for the operator ID is a face photo of the operator captured by a camera attached to the apparatus, for example.

It is not necessary to return the error message to the client 50 and may be returned to any apparatus if the apparatus enables the operator to recognize an error.

In the system as in the second exemplary embodiment, it is considered that the image formation apparatus 40 prints an electronic document, outputs a print document and scans the print document, to thereby determine as to whether or not manipulation of the original electronic document is permitted.

Then, the image formation apparatus 40 according to the second exemplary embodiment will be described.

Figure 10:
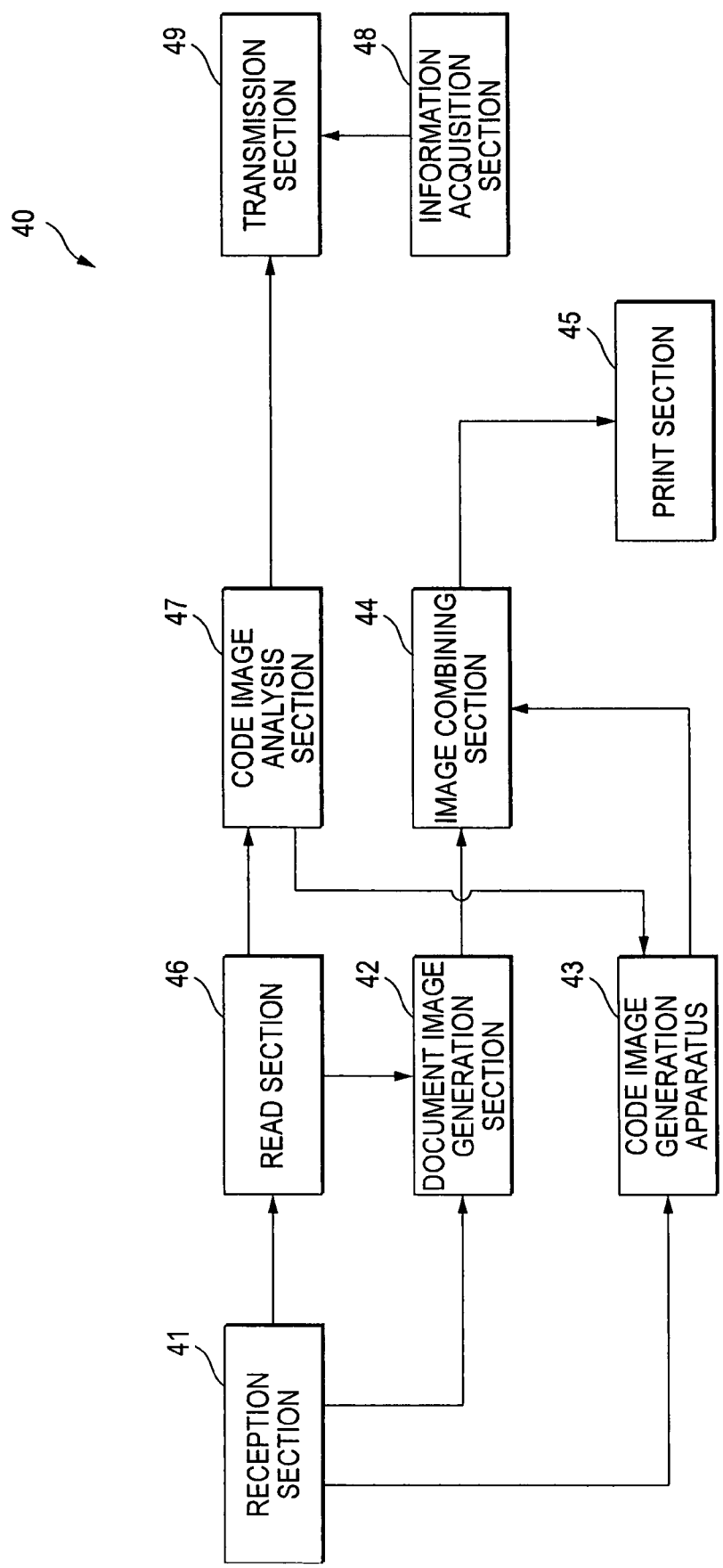
FIG. 10 is a block diagram to show the functional configuration of an image formation apparatus according to the second exemplary embodiment of the invention.

FIG. 10 is a block diagram to show the functional configuration of the image formation apparatus 40 according to the second exemplary embodiment. Here, only the functions involved in image reading and image forming are shown and the function to transmit an image by facsimile is not shown.

As shown in FIG. 10, the image formation apparatus 40 includes a reception section 41, a document image generation section 42, a code image generation section 43, an image combining section 44, a print section 45, a read section 46, a code image analysis section 47, an information acquisition section 48, and a transmission section 49.

The reception section 41 receives an instruction for forming an image on a medium in the format of a PDL (Page Description Language), for example.

The document image generation section 42 generates a document image of the electronic document received by the reception section 41 or a document image based on the original read by the read section 46.

The code image generation section 43 generates information to be embedded in the document image based on the information received by the reception section 41 or the information read by the read section 46. The code image generation section encodes the generated information to generate coded information, and converts the coded information into an image to generate a code image.

The image combining section 44 superposes the document image and the code image on each other to generate a composite image.

The print section 45 prints the composite image generated by the image combining section 44 on a medium. As the print section 45, for example, a print mechanism using electrophotography may be used.

By the way, it is assumed in the second exemplary embodiment that a document image is formed with visible toner and a code image is formed with invisible toner having an absorption wavelength in an infrared region, for example. Therefore, the print section 45 has an image formation unit for invisible toner as well as image formation units for Y (yellow) toner, M (magenta) toner, C (cyan) toner, and K (black) toner. Alternatively, one of the image formation units for Y, M, C, and K toners may be replaced by the image formation unit for invisible toner. The print section 45 has this configuration, so that the document image can be formed with the visible toner and the code image can be formed with the invisible toner on the document image (visible toner).

The read section 46 reads the image from the medium on which the image of the electronic document is formed. As the read section 46, a scanner for applying light to a medium, reading reflected light, etc., and converting it into digital data may be used. In this case, the following configuration may be adopted. That is, light is applied to a surface of a medium from a LED (Light Emitting Diode) light source, reflected light is optically reduced on an image formation lens, and photoelectric conversion of a formed optical image is executed by an image sensor.

By the way, in the second exemplary embodiment, the document image into which the electronic document is converted and the code image into which the encoded information is converted are formed on a medium. In this case, the document image is formed with the visible toner and the code image is formed with the invisible toner having the absorption wavelength in the infrared region, for example. Therefore, as the LED light source, an infrared LED for applying infrared light is provided as well as a white LED for applying visible light, for example. As the image sensor, not only a red light sensor, a green light sensor, and a blue light sensor, but also an infrared light sensor is provided.

The code image analysis section 47 receives the code image read by the read section 46 and analyzes the code image to take out necessary information.

The information acquisition section 48 acquires various pieces of information transmitted together with the information taken out by the code image analysis section 47. The acquired information contains the operator ID of the operator who operates the electronic document using the image formation apparatus 40, the device ID of the image formation apparatus 40, a request for manipulation made using the image formation apparatus 40, and the location ID of the image formation apparatus 40, for example.

The transmission section 49 transmits the information taken out by the code image analysis section 47 and the information acquired by the information acquisition section 48 to the document management server 20.

In the second exemplary embodiment, the document image generation section 42, the code image generation section 43, the image combining section 44, and the print section 45 are adopted in combination as an example of a control section that controls manipulation of an electronic document or a print document.

The functions are implemented as the software and hardware resources cooperate. Specifically, a CPU of the image formation apparatus 40 reads a program for implementing the reception section 41, the document image generation section 42, the code image generation section 43, the image combining section 44, the code image analysis section 47, the information acquisition section 48, and the transmission section 49, for example, into main memory from a magnetic disk unit for execution. The program and data stored in the magnetic disk unit may be loaded from a record medium such as a CD or may be downloaded through a network of the Internet, etc.

Next, the operation of the image formation apparatus 40 having the above configuration will be described below in detail.

The operation of the image formation apparatus 40 involves the operation of printing an electronic document on a medium so as to output a print document and the operation of printing the image read from a print document on another medium, as described above.

To begin with, the operation of printing an electronic document on a medium so as to output a print document will be described.

Figure 11:
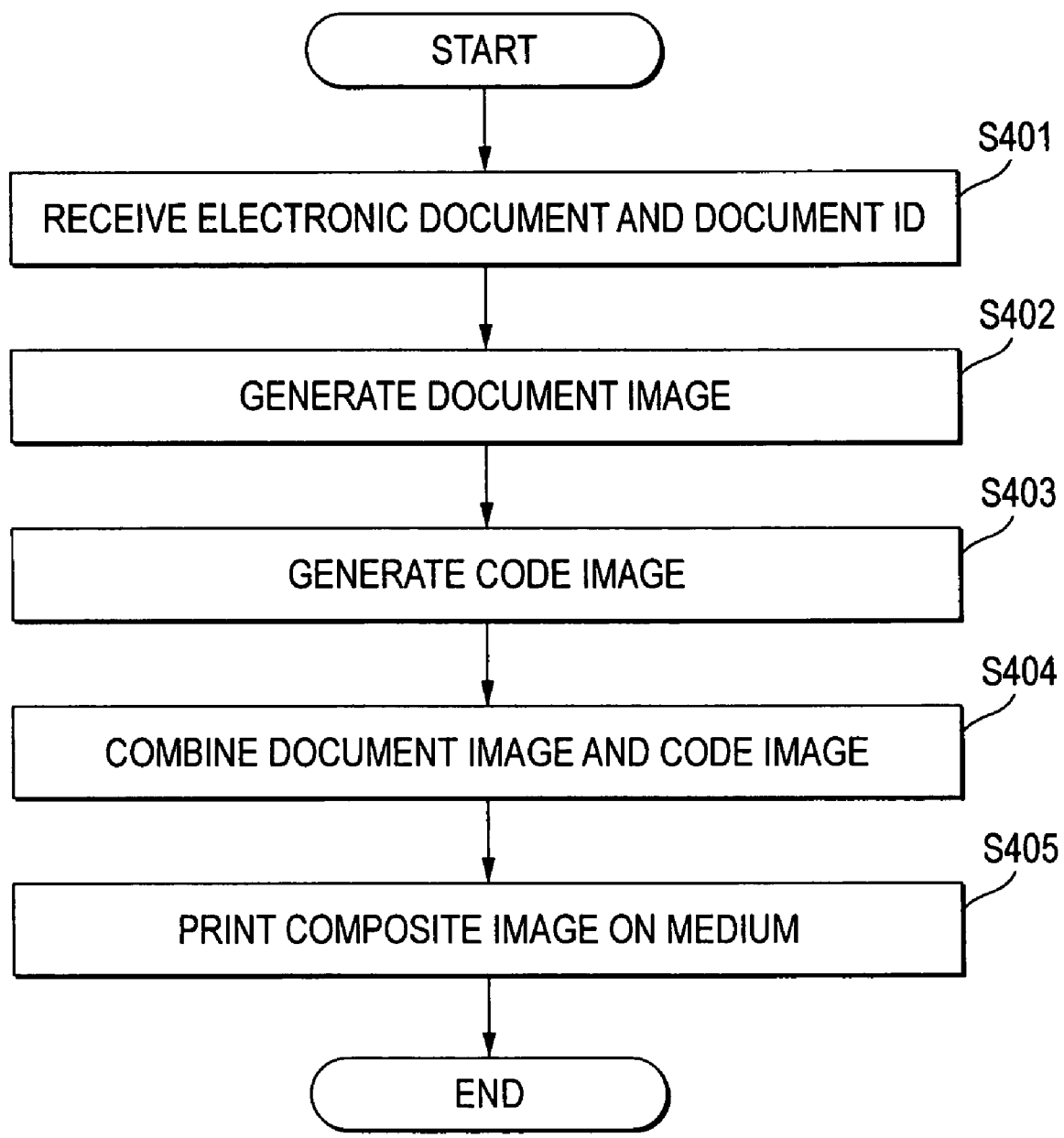
FIG. 11 is a flowchart to show the operation of the image formation apparatus according to the second exemplary embodiment of the invention when an electronic document is printed.

FIG. 11 is a flowchart to show the operation of the image formation apparatus 40 at this time.

In the image formation apparatus 40, at first the reception section 41 receives an electronic document and a document ID of the electronic document from the document management server 20 (step 401). The reception section 41 sends the electronic document to the document image generation section 42 and sends the document ID to the code image generation section 43.

Then, the document image generation section 42 converts the electronic document sent from the reception section 41 into an image to generate a document image (step 402).

On the other hand, the code image generation section 43 encodes the document ID sent from the reception section 41 and encodes position information, so as to generate coded information. Then, the code image generation section 43 converts the encoded information into an image to generate a code image (step 403). The position information indicates coordinate information on a medium. The position information of which are required number are provided based on the paper size, etc., specified in an image formation command.

The image combining section 44 superposes the document image generated at step 402 and the code image generated at step 403 on each other, so as to generate a composite image (step 404).

Then, the print section 45 prints the composite image on a medium according to electrophotography, for example, (step 405). At this time, the document image is printed with the visible toner and the code image is printed with the invisible toner having the absorption wavelength in the infrared region, as described above.

A code pattern on which a code image generated in the second exemplary embodiment is be described.

FIG. 12 is a drawing to describe the code pattern.

First, bit patterns forming a code pattern will be described.

FIG. 12A shows an example of placement of the bit pattern.

The "bit pattern" is the minimum unit to embed information. Here, bits are placed in two positions selected from among nine positions as shown in FIG. 12A. In FIG. 12A, a black square indicates a position where a bit is placed and a hatched square indicates a position where no bit is placed. The number of combinations of selecting two positions from among nine positions is 36 ($=_9C_2$). Therefore, 36 pieces of information (about 5.2 bits) can be represented by a placement method.

By the way, the minimum square shown in FIG. 12A has a size of two dots by two dots in 600 dpi. Since the size of one dot in 600 dpi is 0.0423 mm, one side of the minimum square is 84.6 µm (=0.0423 mm×2). The dots forming the code pattern may be made small as much as possible because the dots becomes more conspicuous as the dots becomes larger. However, if each dot is made too small, it is difficult for a printer to print such a small dot. Then, a value larger than 50 µm and smaller than 100 µm is adopted as the size of the dot. Accordingly, the dot of the optimum size that can be printed by a printer can be formed. That is, the minimum size of the dot that can be stably formed by a printer is 84.6 µm×84.6 µm.

When the dot is set to such a size, one side of one bit pattern becomes about 0.5 mm (=0.0423 mm×2×6).

The code pattern formed of the above bit patterns will be described.

FIG. 12B shows an example of placement of the code patterns.

The minimum square shown in FIG. 12B corresponds to the bit pattern shown in FIG. 12A. In the above description, 36 pieces of information can be represented in one bit pattern. However, in the code pattern, one bit pattern represents information in 32 ways (five-bit information).

An identification code obtained by encoding the identification information is embedded using 16 (=4×4) bit patterns. An X position code obtained by encoding X-direction position information and a Y position code obtained by encoding Y-direction position information are embedded each using four bit patterns. Further, a synchronous code for detecting the position and rotation of the code pattern is embedded in the upper left corner using one bit pattern.

The size of one code pattern is equal to the width of five bit patterns and thus becomes about 2.5 mm. In the second exemplary embodiment, a code image as an image of code pattern thus generated is placed over the full face of paper.

Next, a process of encoding the identification information and the position information and generating the code image from the encoded information will be described. This process is executed at step 403 in FIG. 11.

Figure 13:
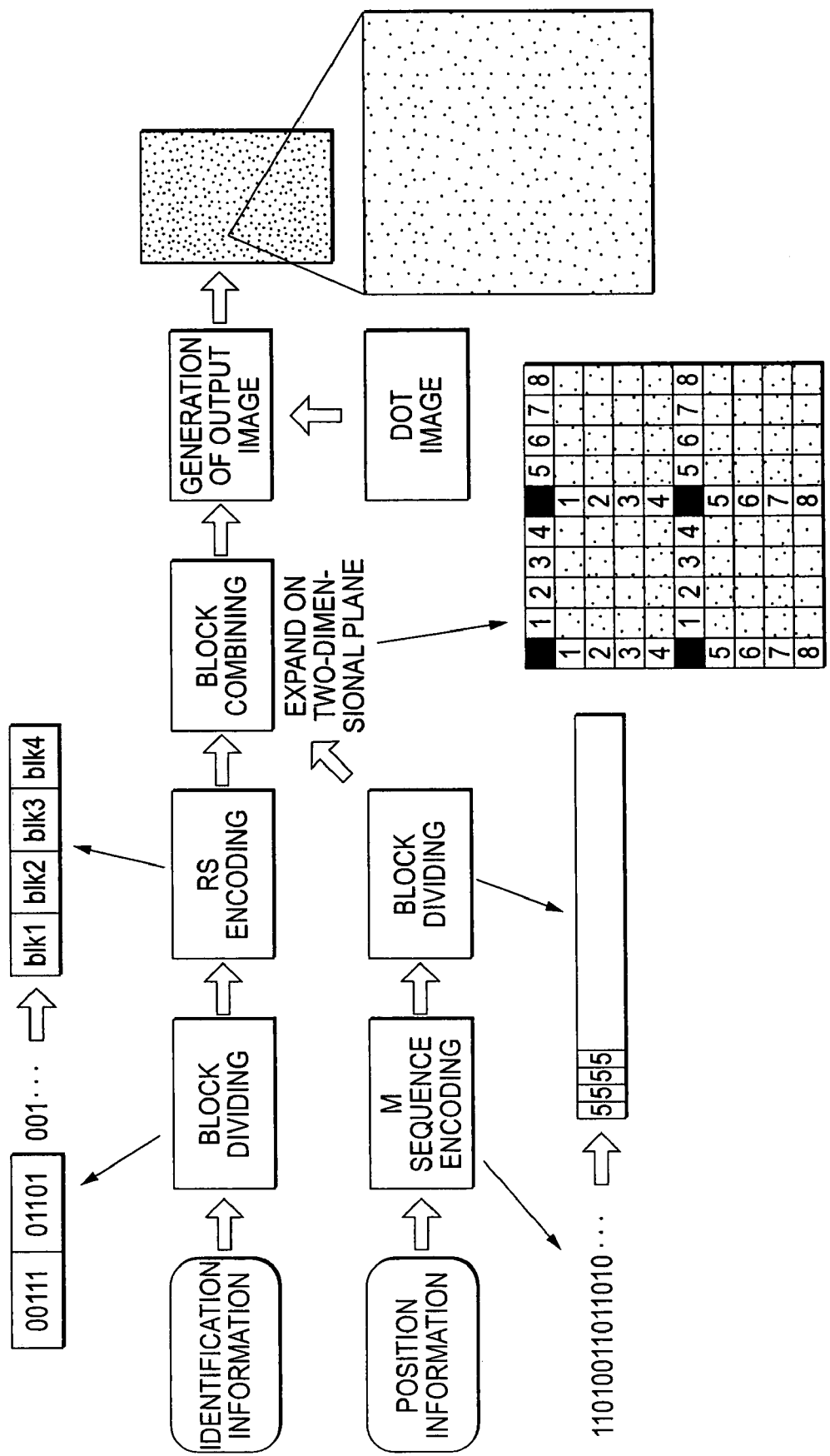
FIG. 13 is a drawing to describe encoding of information and generating of a code image in the second exemplary embodiment of the invention.

FIG. 13 is a drawing to describe the processing of information coding and image generation.

First, encoding of the identification information will be described.

To encode the identification information, RS (Reed-Solomon) codes of a block encoding method are used. In the second exemplary embodiment, information is embedded using bit patterns each capable of representing five-bit information as previously described with reference to FIG. 12. Therefore, an information error also occurs in five-bit units and thus the RS codes of the block encoding system good in encoding efficiency are used. However, the encoding system is not limited to the RS coding, and any other encoding system, such as BCH code, for example, can also be used.

In the second exemplary embodiment, information is embedded using bit patterns each having an information amount of five bits as described above. Therefore, the block length of RS code needs to be set to five bits. Thus, the identification information is divided into five-bit blocks. In FIG. 13, a first block "00111" and a second block "01101" are cut out from the identification information "0011101101001 . . . "

The RS encoding process is performed for the identification information divided into blocks. In FIG. 13, the identification information is divided into blocks like "blk1," "blk2," "blk3," "blk4," . . . and then RS encoding is performed.

By the way, in the second exemplary embodiment, the identification information is divided into 16 (four×four) blocks. Then, the number of code blocks in the RS code can be set to 16. The number of information blocks can be designed in response to the error occurrence situation. For example, assuming that the number of information blocks is eight, RS (16, 8) code results. This code has the nature that if a four-block (=(16−8)÷2) error occurs in the encoded information, it can be corrected. If the position of the error can be located, the correction capability can be further enhanced. In this case, the amount of information stored in the information block is 40 bits (=five bits×eight blocks). Therefore, about trillion types of identification information can be represented.

Next, encoding of the position information will be described.

To encode the position information, M sequence code, a kind of pseudo random sequence, is used. The M sequence is maximum-cycle sequence that can be generated by a K-stage linear shift register, and has a sequence length of $2^K-1$. Any consecutive K bits taken out from the M sequence have such a characteristic that they do not appear at other positions in the same M sequence. Then, this characteristic is used to encode the position information.

By the way, in the second exemplary embodiment, the required order of the M sequence is found from the length of the position information to be encoded, and the M sequence is generated. However, if the length of the position information to be encoded is previously known, it is not necessary to generate the M sequence each time. That is, a fixed M sequence may be previously generated and stored in a memory.

For example, it is assumed that an M sequence having a sequence length of 8191 (K=13) is used.

In this case, the position information is also embedded in five-bit units and thus five bits are taken out at a time from the M sequence having the sequence length 8191 to provide five-bit blocks. In FIG. 13, M sequence "11010011011010 . . ." is divided into five-bit blocks.

Thus, in the second exemplary embodiment, the position information and the identification information are encoded using the difference coding systems, because it is necessary to set the detection capability of the identification information to be set higher than that of the position information. That is, the position information is information to acquire a position on a surface of paper. Thus, if there is a portion that cannot be decoded due to noise, etc., only such a portion becomes defective and the other portions are not affected. In contrast, if decoding of the identification information results in failure, it becomes impossible to detect a target to which writing information is to be reflected.

Thus, when the identification information is divided into blocks and then is encoded according to the RS coding and the position information is encoded according to the M sequence and then is divided into blocks, the blocks are combined as shown in FIG. 13. That is, the blocks are expanded on a two-dimensional plane in a format shown in FIG. 13. The format shown in FIG. 13 corresponds to the format shown in FIG. 12B. That is, the black square represents a synchronous code. Also, "1," "2," "3," "4," . . . placed in the lateral direction represent X position codes and "1," "2," "3," "4," . . . placed in the longitudinal direction represent Y position codes. If positions on the medium position are different, different information is placed in the position codes. Thus, the position code is indicated by numbers corresponding to the coordinate positions. On the other hand, the gray squares represent identification codes. Even if positions on the medium are different, the same identical information is placed in the identification code. Thus, all the identification codes are indicated by the same symbol.

By the way, as shown in FIG. 13, four bit patterns exist between two synchronous codes. Therefore, a 20-bit (=5×4) partial sequence of the M sequence is placed therein. If a 13-bit partial sequence is taken out from the 20-bit partial series, it can be determined as to which part of the whole (8191) the 13-bit partial series is. To thus use 13 bits of 20 bits to determine the position, an error of the taken-out 13-bit portion can be detected or corrected using the remaining seven bits. That is, the integrity of 20 bits is checked using the same generative polynomial when the M sequence is generated. Thereby, it is made possible to detect and correct an error.

Then, the bit patterns in the blocks are converted into an image by referring to dot images. An output image, which represents information by dots as shown in the rightmost portion of FIG. 13, is generated.

For simplicity of the description, the identification information and the position information are clearly distinguished from each other. However, a technique of embedding different position information in a code image from one medium to another and identifying the medium based on the difference in the position information is also available. Then, if such a technique is adopted, it is assumed that the position information also has a function of identifying the medium and the position information is thought of as identification information.

Next, the operation of printing the image read from a print document on another medium will be described.

Figure 14:
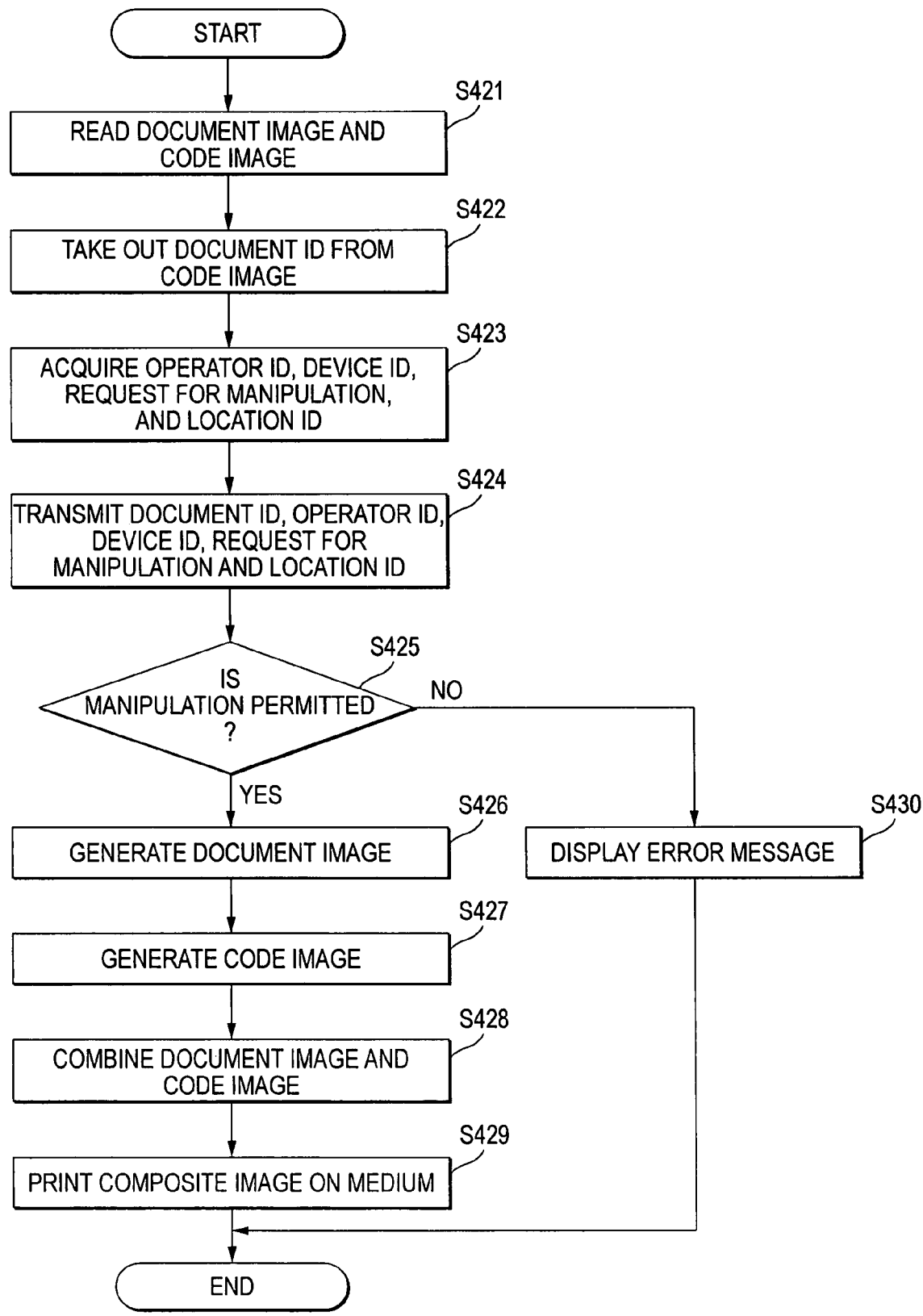
FIG. 14 is a flowchart to show the operation of the image formation apparatus according to the second exemplary embodiment of the invention when a print document is copied.

FIG. 14 is a flowchart to show the operation of the image formation apparatus 40 at this time.

In the image formation apparatus 40, at first the read section 46 reads a document image and a code image from a print document (step 421). Then, the read section 46 sends the read document image to the document image generation section 42 and sends the read code image to the code image analysis section 47.

Next, the code image analysis section 47 takes out a document ID from the send code image and sends the document ID to the transmission section 49 (step 422).

On the other hand, the information acquisition section 48 acquires an operator ID of an operator who uses the image formation apparatus 40, a device ID of the image formation apparatus 40, a request for manipulation that is made using the image formation apparatus 40, and a location ID of the image formation apparatus 40 and sends them to the transmission section 49 (step 423). The operator ID of the operator who uses the image formation apparatus 40 is stored in a memory (not shown) when the operator logs in the image formation apparatus 40. Thus, the information acquisition section 48 takes out the operator ID stored in the memory. The device ID and the location ID of the image formation apparatus 40 are also stored in predetermined areas of the memory. Thus, the information acquisition section 48 takes out the device ID and location ID of the image formation apparatus 40 from the memory.

The transmission section 49 transmits the document ID sent from the code image analysis section 47 and the operator ID, the device ID, the manipulation request, and the location ID, which are sent from the information acquisition section 48, to the document management server 20 (step 424).

Accordingly, the document management server 20 determines as to whether or not manipulation for the original electronic document of the image printed on the print document is permitted in accordance with the process previously described with reference to FIG. 9. If the manipulation is permitted, the original electronic document is returned.

Then, in the image formation apparatus 40, the reception section 41 determines as to whether or not the manipulation is permitted (step 425).

If the reception section 41 determines that the manipulation for the original electronic document is permitted, the image formation apparatus 40 performs a process of printing the electronic document received by the reception section 41 on a medium.

That is, at first, the document image generation section 42 receives the electronic document from the reception section 41 and converts the electronic document into an image, so as to generate a document image (step 426).

On the other hand, the code image generation section 43 encodes the document ID and the position information to generate encoded information, and converts the encoded information into an image so as to generate a code image (step 427). Since the document ID is already taken out by the code image analysis section 47 at step 422, the code image generation section 43 receives this document ID. The position information indicates the coordinate information on a medium, and required number of position information are provided based on the paper size, etc., specified during scanning of the print document.

The image combining section 44 superposes the document image generated at step 426 and the code image generated at step 427 on each other to generate a composite image (step 428).

Then, the print section 45 prints the composite image on a medium by electrophotography, for example, (step 429). At this time, the document image is printed with the visible toner and the code image is printed with the invisible toner having the absorption wavelength in the infrared region, as described above.

On the other hand, if the reception section 41 does not determine that the manipulation for the original electronic document is permitted, the image formation apparatus 40 displays an error message indicating the electronic document is not permitted to be manipulated, on a display (not shown) (step 430) and terminates the process.

In the second exemplary embodiment, the IP address is adopted as the information indicating the location of the apparatus, but the invention is not limited thereto. For example, the GPS (global positioning system) or infrared radiation may be used. In the case of using the GPS, it is also made possible to limit access to an electronic document from an apparatus such as a mobile telephone depending on the location, for example. In the case of using infrared radiation, the location where an apparatus is placed may be recognized depending on the whether or not the apparatus senses infrared radiation.

The first and second exemplary embodiments have been described.

By the way, with regard to the process of determining as to whether or not manipulation for an electronic document is permitted, the operation shown in FIG. 5 is described in the first exemplary embodiment and the operation shown in FIG. 9 is described in the second exemplary embodiment. However, the operation shown in FIG. 9 may be executed in the first exemplary embodiment or the operation shown in FIG. 5 may be executed in the second exemplary embodiment. For example, in the first exemplary embodiment, the document ID, the operator ID, the device ID, and the manipulation request may be transmitted from the beginning and whether or not manipulation on the electronic document is permitted may be determined based on whether or not management information associating the IDs and the request for manipulation with each other is stored in the management information storage section 23.

In the first and second exemplary embodiments, the management information associating the operator ID, the device ID, the manipulation information, the area information, etc., with an electronic document is stored, and the access right to the electronic document is examined based on the management information. However, similar information may be associated with a print document obtained by printing the image of an electronic document on a medium such as a sheet of paper, and the access right to the print document may be examined. In such a sense, the exemplary embodiments may be understood as an exemplary embodiment for storing the management information associating the operator ID, the device ID, the manipulation information, the area information, etc., with a document and examining the access right to the document based on the management information. In this case, however, it is assumed that the term "document" contains an electronic document as electronic data and a print document obtained by printing the image of an electronic document on a medium.

By the way, in the exemplary embodiments, the document management server 20 is illustrated as the document manipulation authentication apparatus, and the image formation apparatus 40 is illustrated as the document manipulation apparatus. However, the function of the document manipulation authentication apparatus can also be implemented by the client 10, 50, the document storage server 30, or the image formation apparatus 40. The function of the document manipulation apparatus may also be implemented by the client 10, 50.

Then, it is assumed that the document manipulation authentication apparatus and the document manipulation apparatus are implemented as a general computer 90, and the hardware configuration of the computer 90 will be described.

Figure 15:
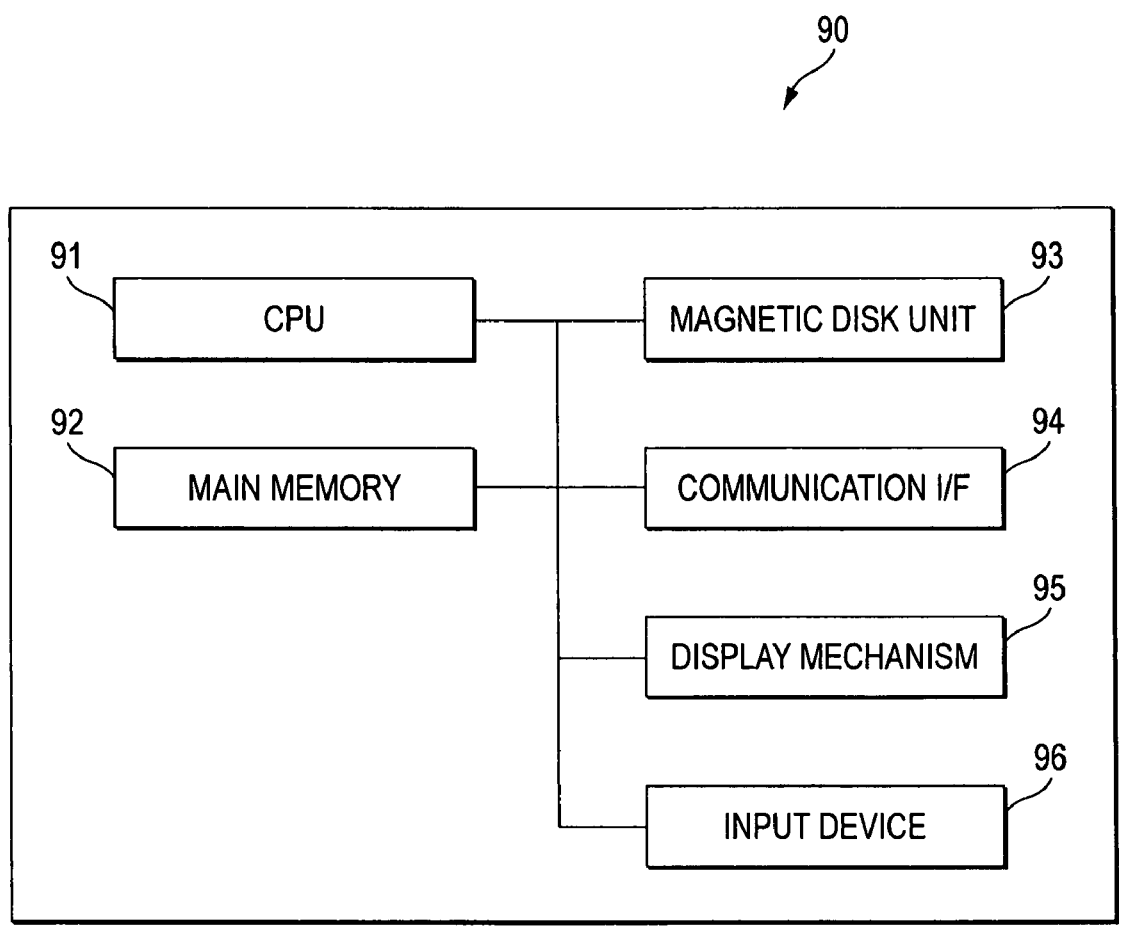
FIG. 15 is a block diagram to show the hardware configuration of a computer for implementing the document manipulation authentication apparatus according to the exemplary embodiments of the invention.

FIG. 15 is a block diagram to show the hardware configuration of the computer 90.

As shown in the figure, the computer 90 includes a CPU (Central Processing Unit) 91 of computation means and main memory 92 and a magnetic disk unit (HDD (Hard Disk Drive)) 93 of storage section. The CPU 91 executes OS (Operating System) and various software programs of applications, etc., and realizes the functions described above. The main memory 92 is a storage area for storing various software programs and data used for execution of the software, and the magnetic disk unit 93 is a storage area for storing input data to various software programs, output data from various software programs, and the like.

The computer 90 further includes a communication I/F 94 for conducting external communications, a display mechanism 95 made up of video memory, a display, etc., and input devices 96 of a keyboard, a mouse, etc.

The program for implementing the exemplary embodiment can be provided not only by communication means, but also by a record medium such as a CD-ROM storing the program.

The foregoing description of the exemplary embodiments of the invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

FIG. 2
21 RECEPTION SECTION
22 REGISTRATION SECTION
23 MANAGEMENT INFORMATION STORAGE SECTION
24 DETERMINATION SECTION
25 TRANSMISSION SECTION

FIG. 3
S201 RECEIVE ELECTRONIC DOCUMENT, OPERATOR ID, DEVICE ID AND MANIPULATION INFORMATION
S202 GENERATE DOCUMENT ID AND FOLDER NAME
S203 REGISTER DOCUMENT ID, OPERATOR ID, DEVICE ID, MANIPULATION INFORMATION AND STORAGE LOCATION
S204 TRANSMIT ELECTRONIC DOCUMENT TO DOCUMENT STORAGE SERVER

FIG. 4
1. DOCUMENT ID
2. OPERATOR ID
3. DEVICE ID.
4. MANIPULATION INFORMATION
5. DOCUMENT NAME
6. STORAGE LOCATION
7. NEW FUNCTION SPECIFICATION
8. BUDGET MANAGEMENT TABLE
9. NEW FUNCTION DRAWING

FIG. 5
S221 RECEIVE OPERATOR ID AND DEVICE ID
S222 TRANSMIT INFORMATION OF ELECTRONIC DOCUMENTS THAT ARE PERMITTED TO BE MANIPULATED
S233 RECEIVE DOCUMENT ID AND ELECTRONIC DOCUMENT MANIPULATION ID
S224 DOES MANIPULATION INFORMATION CONTAIN SPECIFIED MANIPULATION?
S225 TAKE OUT ELECTRONIC DOCUMENT
S226 MANIPULATE ELECTRONIC DOCUMENT IN ACCORDANCE WITH REQUEST FOR MANIPULATION
S227 TRANSMIT ERROR MESSAGE

FIG. 7
S251 RECEIVE ELECTRONIC DOCUMENT, OPERATOR ID, DEVICE ID AND MANIPULATION INFORMATION
S252 GENERATE DOCUMENT ID AND FOLDER NAME
S253 REGISTER DOCUMENT ID, OPERATOR ID, DEVICE ID, MANIPULATION INFORMATION, AREA INFORMATION AND STORAGE LOCATION
S254 TRANSMIT ELECTRONIC DOCUMENT TO DOCUMENT STORAGE SERVER

FIG. 8
1. DOCUMENT ID
2. OPERATOR ID
3. DEVICE ID
4. MANIPULATION INFORMATION
5. AREA INFORMATION
6. DOCUMENT NAME
7. STORAGE LOCATION
8. NEW FUNCTION SPECIFICATION
9. BUDGET MANAGEMENT TABLE
10. NEW FUNCTION DRAWING

FIG. 9
S271 RECEIVE DOCUMENT ID, OPERATOR ID, DEVICE ID AND REQUEST FOR MANIPULATION, ETC.
S272 IS REQUEST FOR MANIPULATION B, DL OR C?
S273 ACQUIRE LOCATION ID OF REQUESTING APPARATUS
S274 ACQUIRE LOCATION ID OF OUTPUT DESTINATION APPARATUS OF ELECTRONIC DOCUMENT
S275 IS MANIPULATION PERMITTED?
S276 TAKE OUT ELECTRONIC DOCUMENT
S277 MANIPULATE ELECTRONIC DOCUMENT IN ACCORDANCE WITH REQUEST FOR MANIPULATION
S278 TRANSMIT ERROR MESSAGE

FIG. 10
41 RECEPTION SECTION
42 DOCUMENT IMAGE GENERATION SECTION
43 CODE IMAGE GENERATION APPARATUS
44 IMAGE COMBINING SECTION
45 PRINT SECTION
46 READ SECTION
47 CODE IMAGE ANALYSIS SECTION
48 INFORMATION ACQUISITION SECTION
49 TRANSMISSION SECTION

FIG. 11
S401 RECEIVE ELECTRONIC DOCUMENT AND DOCUMENT ID
S402 GENERATE DOCUMENT IMAGE
S403 GENERATE CODE IMAGE
S404 COMBINE DOCUMENT IMAGE AND CODE IMAGE
S405 PRINT COMPOSITE IMAGE ON MEDIUM

FIG. 12
1. SYNCHRONOUS CODE
2. X POSITION CODE
3. Y POSITION CODE
4. IDENTIFICATION CODE

FIG. 13
1. IDENTIFICATION INFORMATION
2. BLOCK DIVIDING
3. RS ENCODING
4. BLOCK COMBINING
5. GENERATION OF OUTPUT IMAGE
6. POSITION INFORMATION
7. M SEQUENCE ENCODING
8. BLOCK DIVIDING
9. EXPANDING ON TWO-DIMENSIONAL PLANE
10. DOT IMAGE

FIG. 14
S421 READ DOCUMENT IMAGE AND CODE IMAGE
S422 TAKE OUT DOCUMENT ID FROM CODE IMAGE
S423 ACQUIRE OPERATOR ID, DEVICE ID, REQUEST FOR MANIPULATION, AND LOCATION ID
S424 TRANSMIT DOCUMENT ID, OPERATOR ID, DEVICE ID, REQUEST FOR MANIPULATION AND LOCATION ID
S425 IS MANIPULATION PERMITTED?
S426 GENERATE DOCUMENT IMAGE
S427 GENERATE CODE IMAGE
S428 COMBINE DOCUMENT IMAGE AND CODE IMAGE
S429 PRINT COMPOSITE IMAGE ON MEDIUM
S430 DISPLAY ERROR MESSAGE

FIG. 15
92 MAIN MEMORY
93 MAGNETIC DISK UNIT

94 COMMUNICATION I/F
95 DISPLAY MECHANISM
96 INPUT DEVICE

What is claimed is:

1. A document manipulation authentication apparatus comprising:
   a storage device that stores management information associating plural documents with places where the plural documents can be handled; and
   a determination section programmed to be executable by a computer, wherein,
   when the determination section receives, from a client connected to the document manipulation authentication apparatus via a network, a request for faxing a specific document to one of a plurality of image forming apparatuses which are connected to the network, the determination section determines as to whether or not the faxing to the one of the plurality of image forming apparatuses is permitted, based on whether or not the specific document and a location where the one of the plurality of image forming apparatuses is located are associated with each other in the management information stored in the storage device, and
   when the determination section determines that the faxing of the specific document is permitted, a command for the faxing of the specific document is directly transmitted to the one of the plurality of image forming apparatuses,
   wherein a print device of the image forming apparatus prints a code image based on an identification code, which is provided by encoding at least one of identification information read by a reading device, identification information of the image forming apparatus, identification of a user and newly generated identification information, with an invisible image formation material having an absorption wavelength in an infrared region.

2. An image formation apparatus comprising:
   a reading device that reads, from a print document provided by forming an image of an electronic document on a medium, identification information of the electronic document or identification information of the print document;
   a first acquisition section that acquires identification information of the image formation apparatus;
   a second acquisition section that allows a user to input identification of the user;
   a transmission section that transmits the identification information of the user together with the identification information read by the reading device and the identification information acquired by the first acquisition section to another device;
   a reception section that receives information indicating as to whether or not the image formation apparatus is allowed to print the electronic document or the print document, from the other device as a response to the information transmission executed by the transmission section; and
   a print device that prints the image of the electronic document or an image of the print document in accordance with the information received by the reception section, wherein
   the print device prints, in accordance with the information received by the reception section, a code image based on an identification code, which is provided by encoding at least one of the identification information read by the reading device, the identification information of the image forming apparatus, the identification of the user and newly generated identification information, with an invisible image formation material having an absorption wavelength in an infrared region.

3. The document manipulation authentication apparatus according to claim 1, wherein
   when the determination section receives, from the client, a request for browsing, downloading or printing the specific document in the client, the determination section determines as to whether or not the browsing, the downloading or the printing of the specific document is permitted, based on whether or not the specific document and the location where the one of the plurality of image forming apparatuses is located are associated with each other in the management information stored in the storage device.

4. The document manipulation authentication apparatus according to claim 1, wherein
   the management information stored in the storage device further associates each document with a person who is permitted to manipulate each document,
   when a specific person makes a request for manipulating the specific document, the determination section determines as to whether or not the requested manipulating of the specific document is permitted, based on whether or not the specific person and the specific document are associated with each other in the management information stored in the storage device.

5. A non-transitory computer readable recording medium storing a program which when executed causes a computer to execute a document manipulation authentication process, wherein
   management information associates plural documents with places where the plural documents can be handled is stored in a storage device, and
   the document manipulation authentication process comprises:
   when receiving, from a client connected to the computer via a network, a request for faxing a specific document to one of a plurality of image forming apparatuses which are connected to the network, determining as to whether or not the faxing to the one of the plurality of image forming apparatuses is permitted, based on whether or not the specific document and a location where the one of the plurality of image forming apparatuses is located are associated with each other in the management information stored in the storage device, and
   when it is determined that the faxing of the specific document is permitted, transmitting a command for the faxing of the specific document directly to the one of the plurality of image forming apparatuses,
   wherein a print device of the image forming apparatus prints a code image based on an identification code, which is provided by encoding at least one of identification information read by a reading device, identification information of the image forming apparatus, identification of a user and newly generated identification information, with an invisible image formation material having an absorption wavelength in an infrared region.

6. The non-transitory computer readable recording medium according to claim 5, wherein
   the document manipulation authentication process further comprises:
   when receiving, from the client, a request for browsing, downloading or printing the specific document in the client, determining as to whether or not the browsing, the downloading or the printing of the specific document is permitted, based on whether or not the specific document and the location where the one of the plurality of image forming apparatuses is located are associated with each other in the management information stored in the storage device.

7. The non-transitory computer readable recording medium according to claim 5, wherein the management information stored in the storage device further associates each document with a person who is permitted to manipulate each document, the document manipulation authentication process further comprises:

when a specific person makes a request for manipulating the specific document, determining as to whether or not the requested manipulating of the specific document is permitted, based on whether or not the specific person and the specific document are associated with each other in the management information stored in the storage device.

* * * * *